Figure 1:
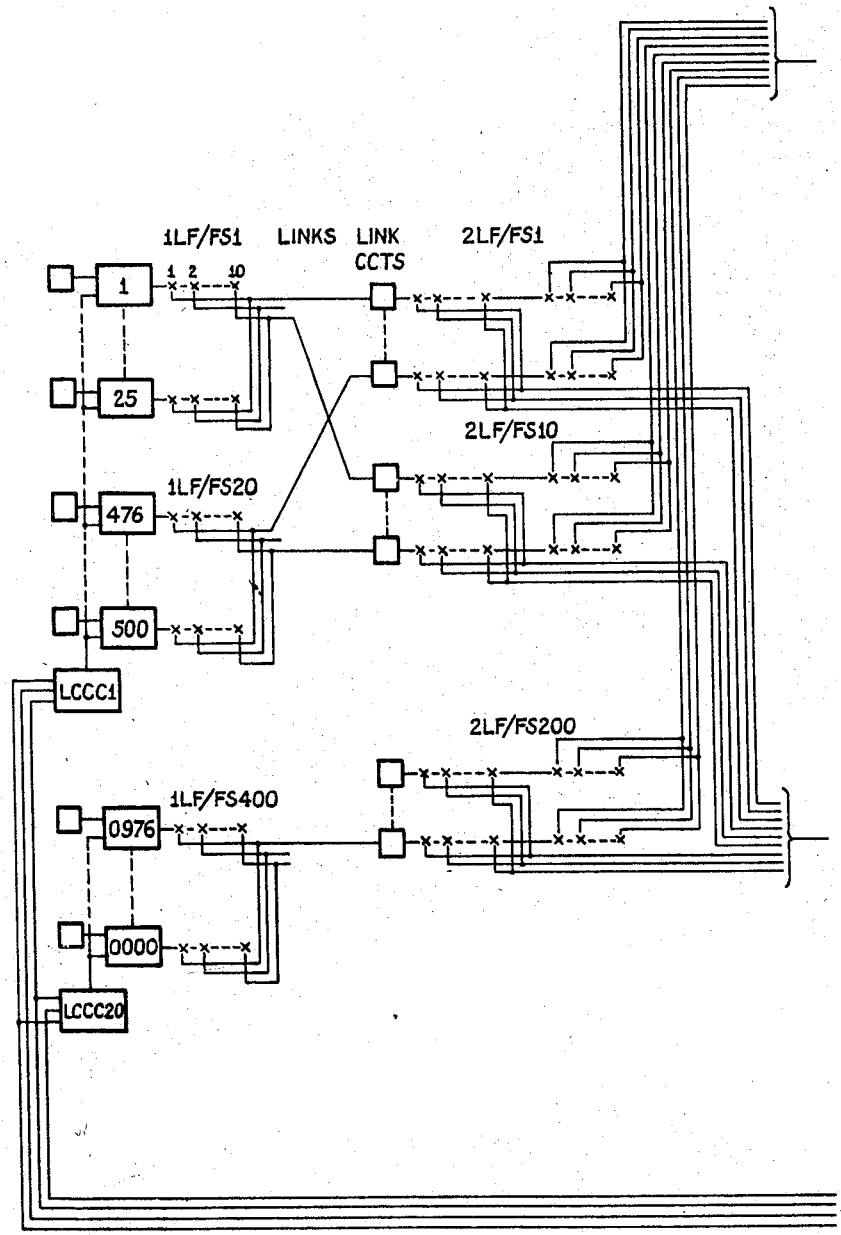

INVENTORS
ALAN DAVISON AND
RONALD THREADGOLD
BY
ATTORNEYS

INVENTORS
ALAN DAVISON AND
RONALD THREADGOLD
BY
ATTORNEYS

INVENTORS
Alan Davison and
Ronald Threadgold
BY
Lippincott & Smith.
ATTORNEYS

INVENTORS
ALAN DAVISON and
RONALD THREADGOLD
BY
ATTORNEYS

April 14, 1959 A. DAVISON ET AL 2,882,342
ELECTRONIC TELEPHONE SYSTEM
Filed Jan. 12, 1953 21 Sheets-Sheet 15

INVENTORS
ALAN DAVISON AND
RONALD THREADGOLD
BY
Lippincott & Smith
ATTORNEYS

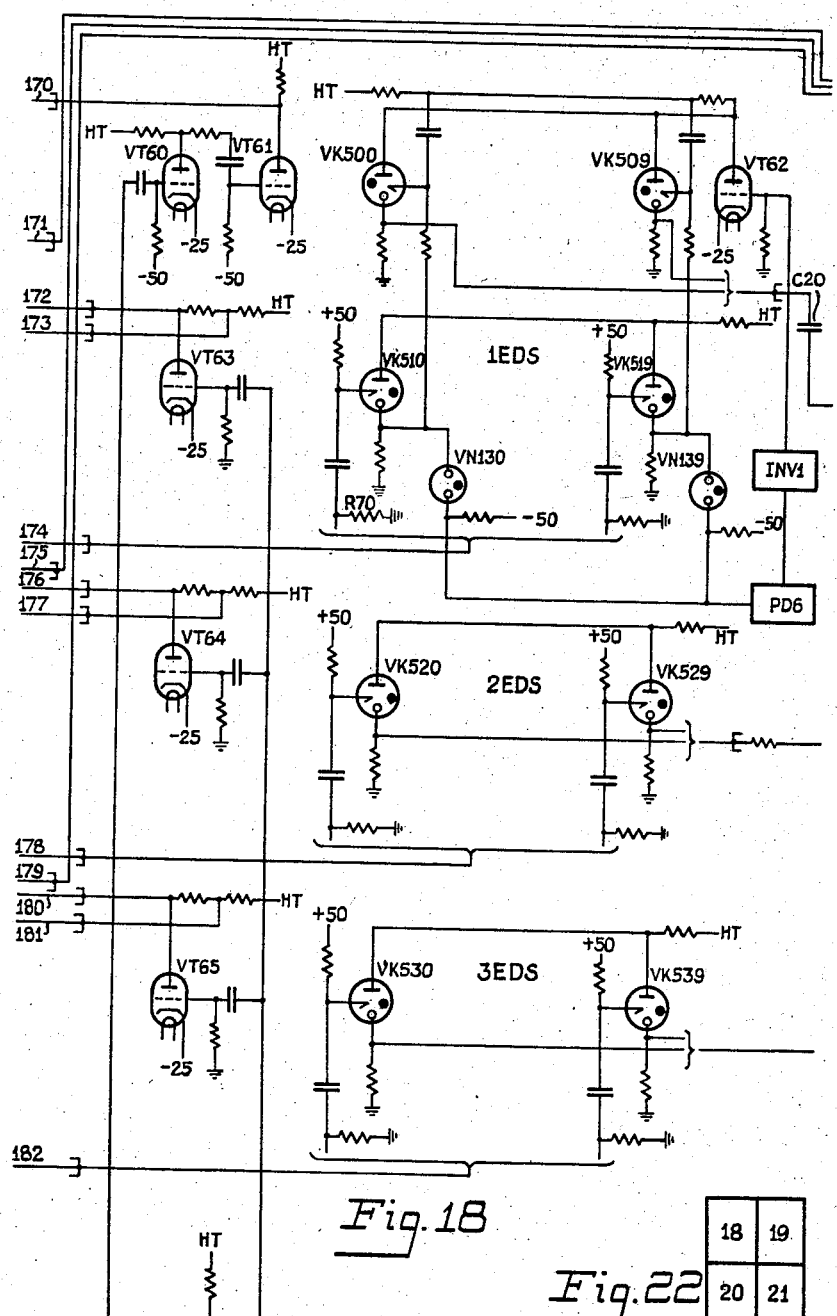

INVENTORS
ALAN DAVISON AND
BY RONALD THREADGOLD
ATTORNEYS

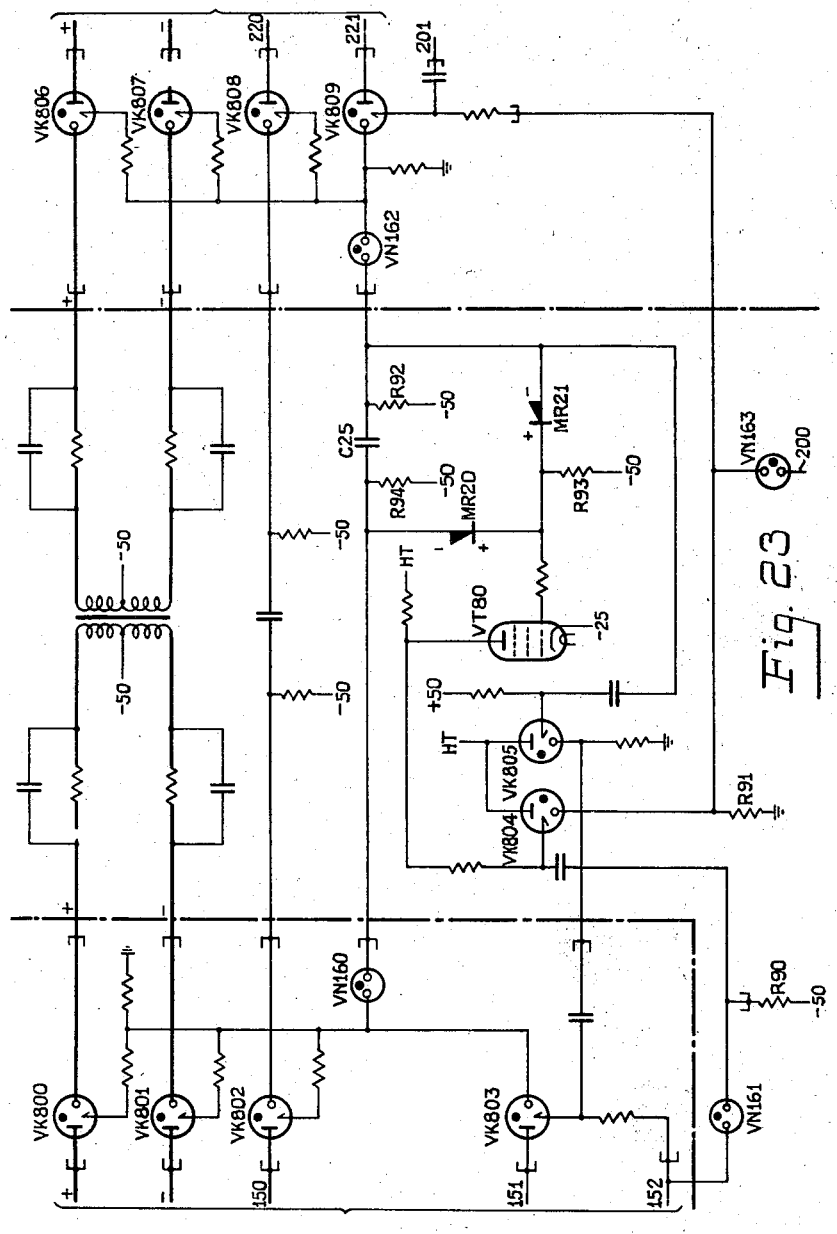

INVENTORS
ALAN DAVISON AND
RONALD THREADGOLD
BY
ATTORNEYS

United States Patent Office 2,882,342
Patented Apr. 14, 1959

2,882,342

ELECTRONIC TELEPHONE SYSTEM

Alan Davison and Ronald Threadgold, Liverpool, England, assignors to Automatic Telephone & Electric Company, Limited, Liverpool, England, a British company Application January 12, 1953, Serial No. 330,638

Claims priority, application Great Britain
January 16, 1952

12 Claims. (Cl. 179—18)

The present invention relates to telephone systems and is more particularly concerned with systems in which electronic means are provided for setting up speech connections between a calling and a called subscriber and for controlling the setting up of connections.

The invention is primarily concerned with systems in which a plurality of sets of gas discharge devices are employed for completing conversational and control paths between inlets and outlets and one of the objects of the invention is to provide an improved system of this type and also an improved switching device for use in such a system.

Other objects of the invention are the provision of electronic devices for use in electronic or electro-mechanical telephone systems for performing certain functions such as translation.

According to one feature of the invention in a switching arrangement employing sets of gas discharge devices for completing conversational and control paths, sets of gas discharge devices are arranged in a plurality of groups to form a primary switching unit, each of a plurality of inlets being associated with a group of gas discharge devices while corresponding sets of gas discharge devices from each group are associated with the same outlet and further sets of gas discharge devices are similarly arranged in a plurality of groups to form a secondary switching unit, the outlets from a plurality of primary switching units being connected to the inlets of a plurality of secondary switching units over link circuits in such a manner that the outlets from each primary switching unit extend to inlets of different secondary switching units.

According to another feature of the invention, in a telephone system employing sets of gas discharge devices for completing conversational and control paths, each switching stage comprises primary and secondary switching units connected by electronic link circuits, each primary and secondary switching unit consisting of sets of gas discharge devices arranged in a plurality of groups, the control of the switching stages being effected by common electronic equipments one of which is associated with the stage at which subscribers' lines terminate and which is adapted to operate as the first or the last stage in a connection while a second is associated with intermediate switching units.

According to a further feature of the invention, an arrangement for translating one set of digits into another set of digits comprises a plurality of first gas discharge devices each one of which is individual to a particular combination of two digits of said first set, a plurality of groups of second gas discharge devices each group of which is associated with one of said first gas discharge devices, the number of second gas discharge devices in a group being equal to the possible number of values of a third digit of said first set, means for causing one of said first gas discharge devices to strike in response to the storing of two digits of said first set, means for causing one of said second gas discharge devices to strike in response to the striking of said one of said first gas discharge devices and to the storing of said third digit and means responsive to the striking of said one of said second gas discharge devices for storing said other set of digits.

According to yet another feature of the invention, in an arrangement for translating one digit or one set of digits into another digit or set of digits, a gas discharge device is provided individual to each combination of the digits of said one set and the striking of one of said gas discharge devices is arranged to control the operation of one or more storage devices in accordance with the translated digit or digits.

According to a further feature of the invention, in a telephone system employing sets of gas discharge devices for completing conversational and control paths each switching stage comprises primary and secondary switching units, the outlets from each of a plurality of primary switching units being connected to inlets of different secondary switching units and connections are set up under the control of common electronic equipment by forwardly marking all available paths from a primary switching unit to the secondary switching units connected thereto, operating an electronic hunting device to select the first available path and controlling the operation of the set of discharge devices associated with the selected path in the secondary switching unit and subsequently of the set of discharge devices associated with the selected path in the primary switching unit.

According to still a further feature of the invention, an electronic hunting arrangement for selecting the first available one of a plurality of paths or a plurality of equipments comprises a first series of tubes representative of said paths or said equipments and arranged to be struck if the associated path or equipment is available, a second series of tubes arranged to be struck on the application thereto of a pulse if the corresponding tube in the first series has been struck and a third series of tubes arranged to be struck on the application thereto of a pulse if the corresponding tube in the first series is non-conducting, the striking of a tube of the second series serving to take into use the associated path or equipment while the striking of a tube of the third series serves to pass on a pulse to the next tubes of the second and third series.

According to another feature of the invention, in an electronic circuit arrangement for transferring digits from two or more first electronic storage devices to a corresponding number of second electronic storage devices digit storage is effected by causing the striking of one gas discharge tube in each storage device and transfer of the digits from the first to the second storage devices is effected by applying a pulse simultaneously to the cathodes of all the tubes in all the storage devices and the momentary increase in the cathode potential of the tubes which have been struck causes a pulse to be applied to strike the corresponding tubes in the second storage devices.

According to a further feature of the invention, in an electronic register provided with a plurality of electronic storage circuits one for each digit in a called subscriber's number to a predetermined maximum in order to enable the registration of the digits on the appropriate storage circuits where different numbers of exchange digits occur in the wanted subscribers' numbers, arrangements are provided which on the reception of an exchange code digit or digits which determines or determine that less than the maximum number of exchange digits will be received, cause a sequence device to advance to a position such that the next incoming digit will be stored on the storage circuit appropriate to the first numerical digit.

Figure 2:
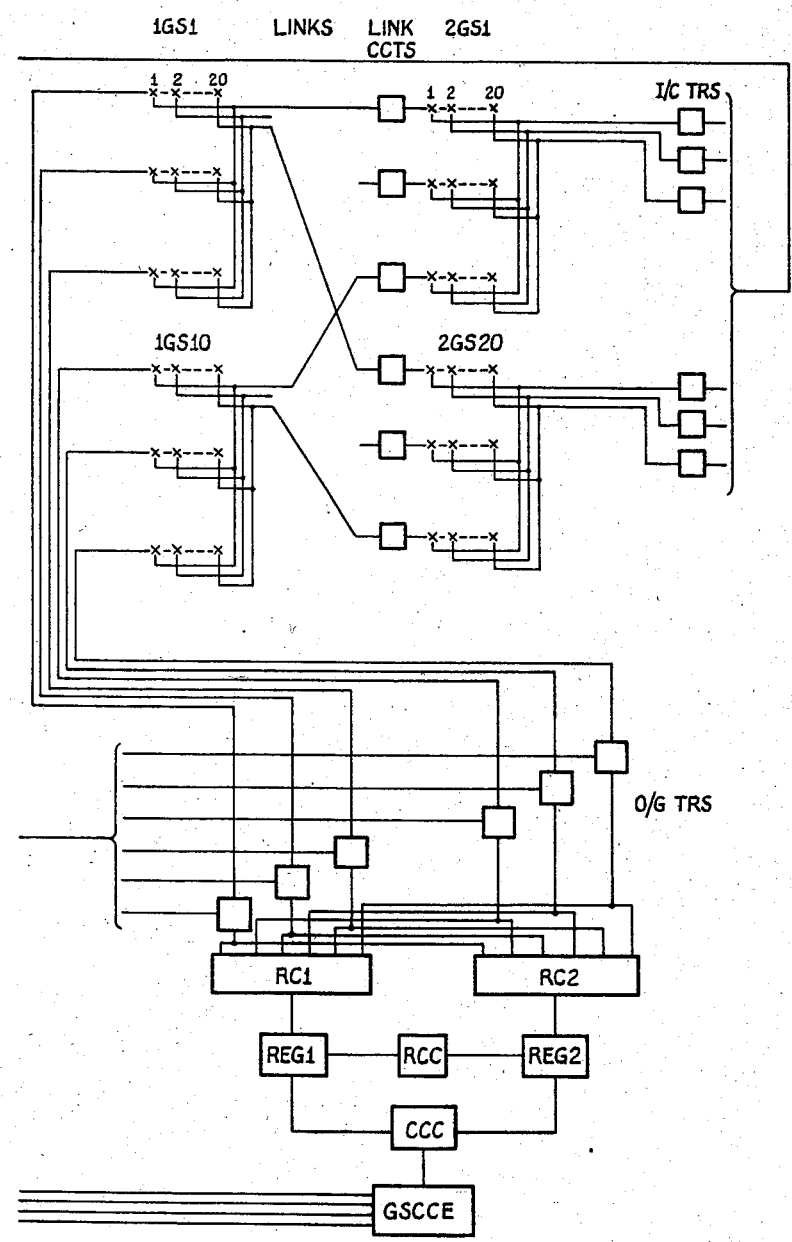
Figure 3:
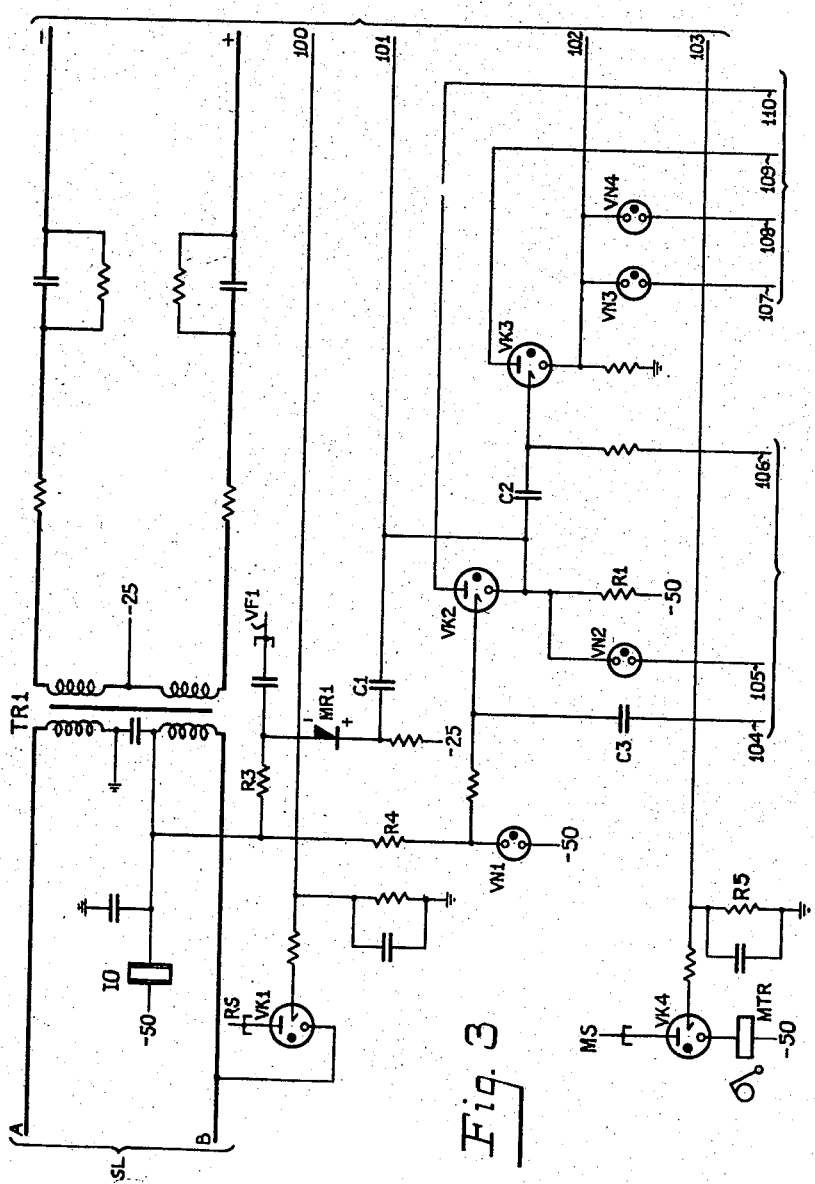
Figure 4:
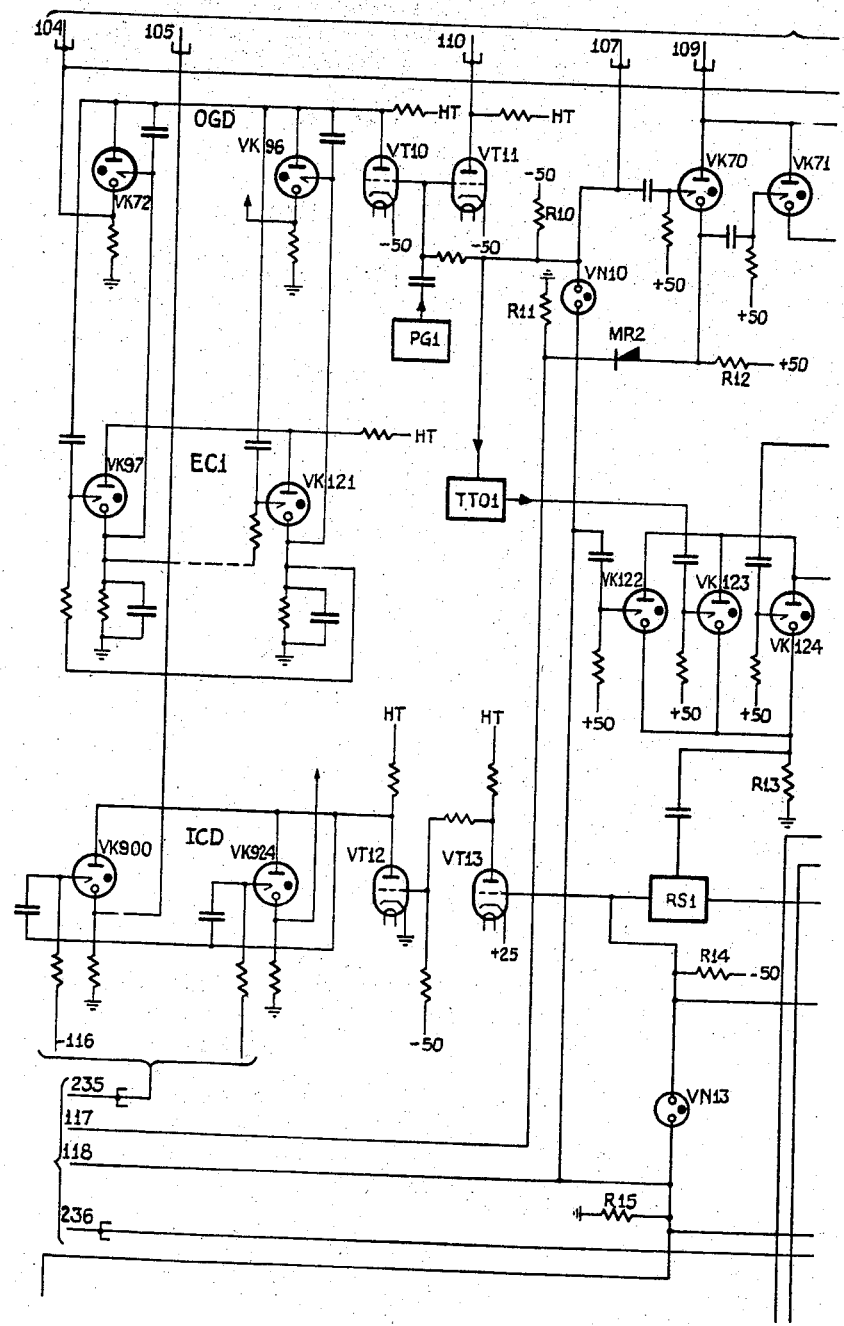
Figure 5:
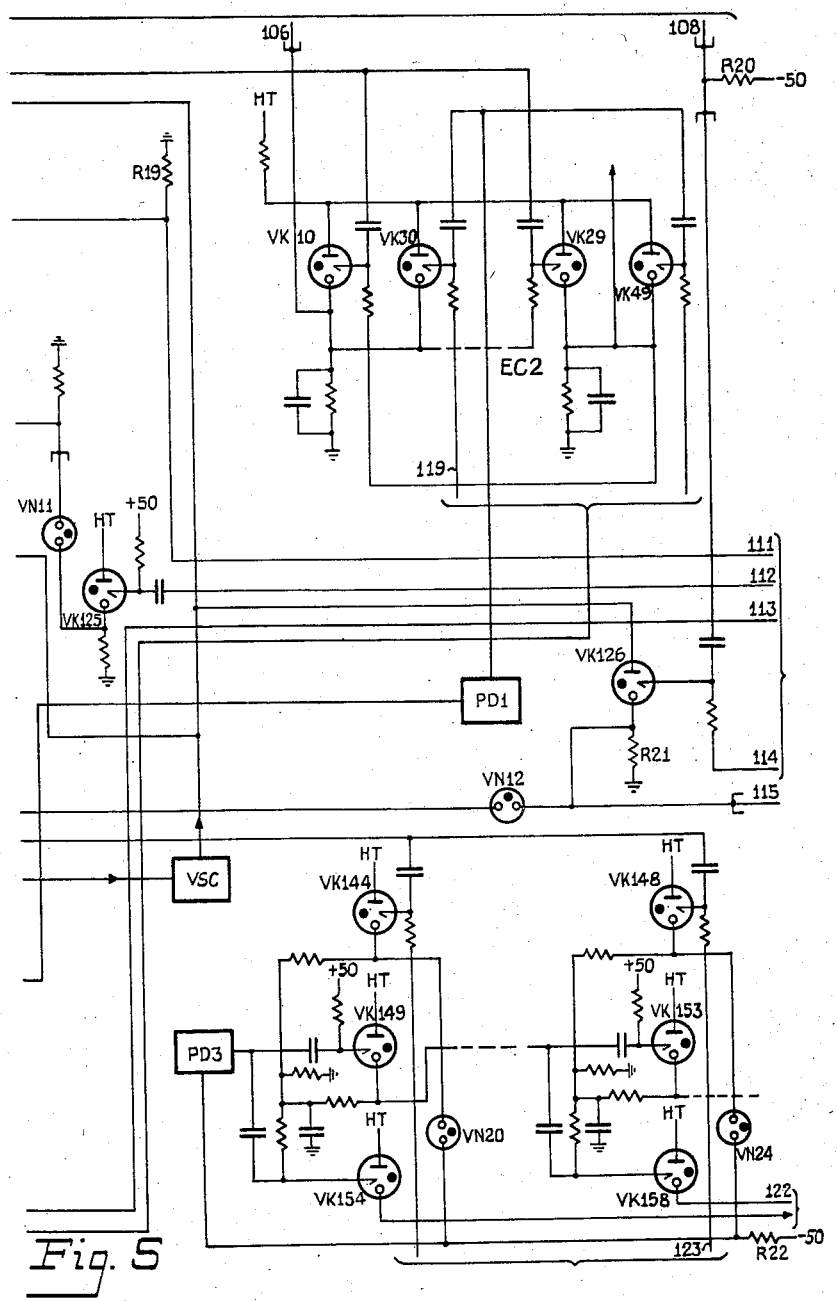
Figures 6, 7:
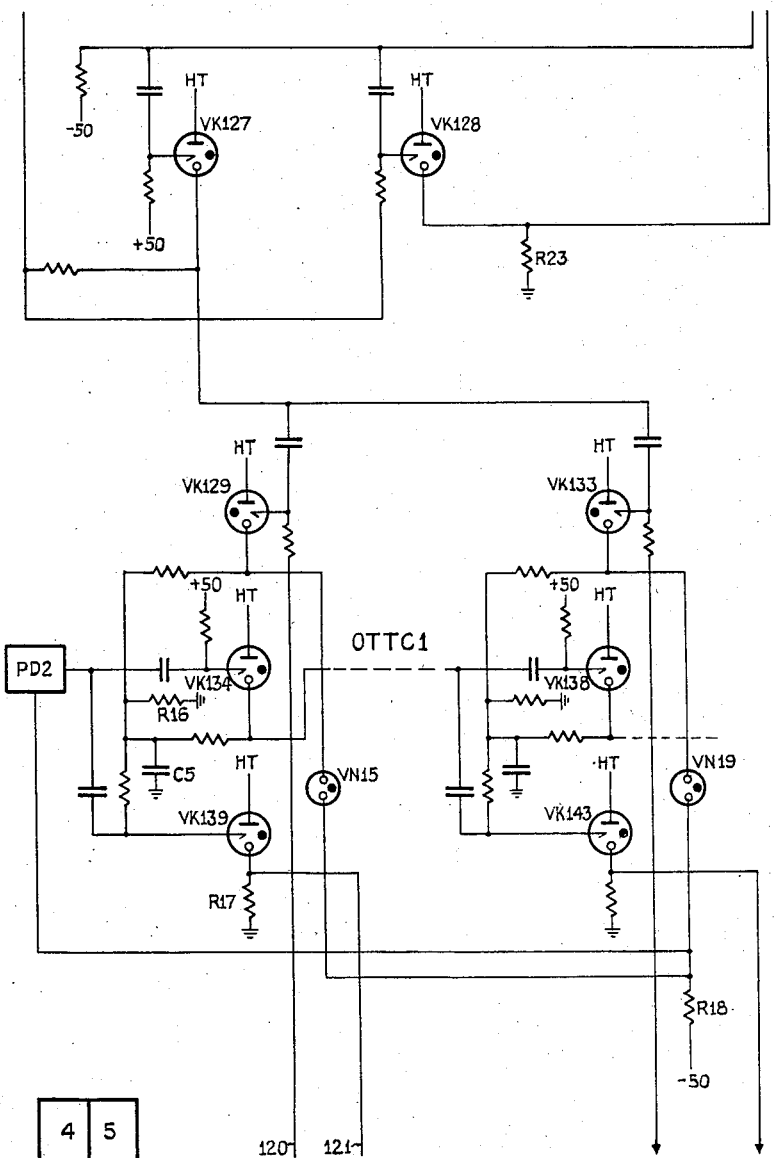
Figure 8:
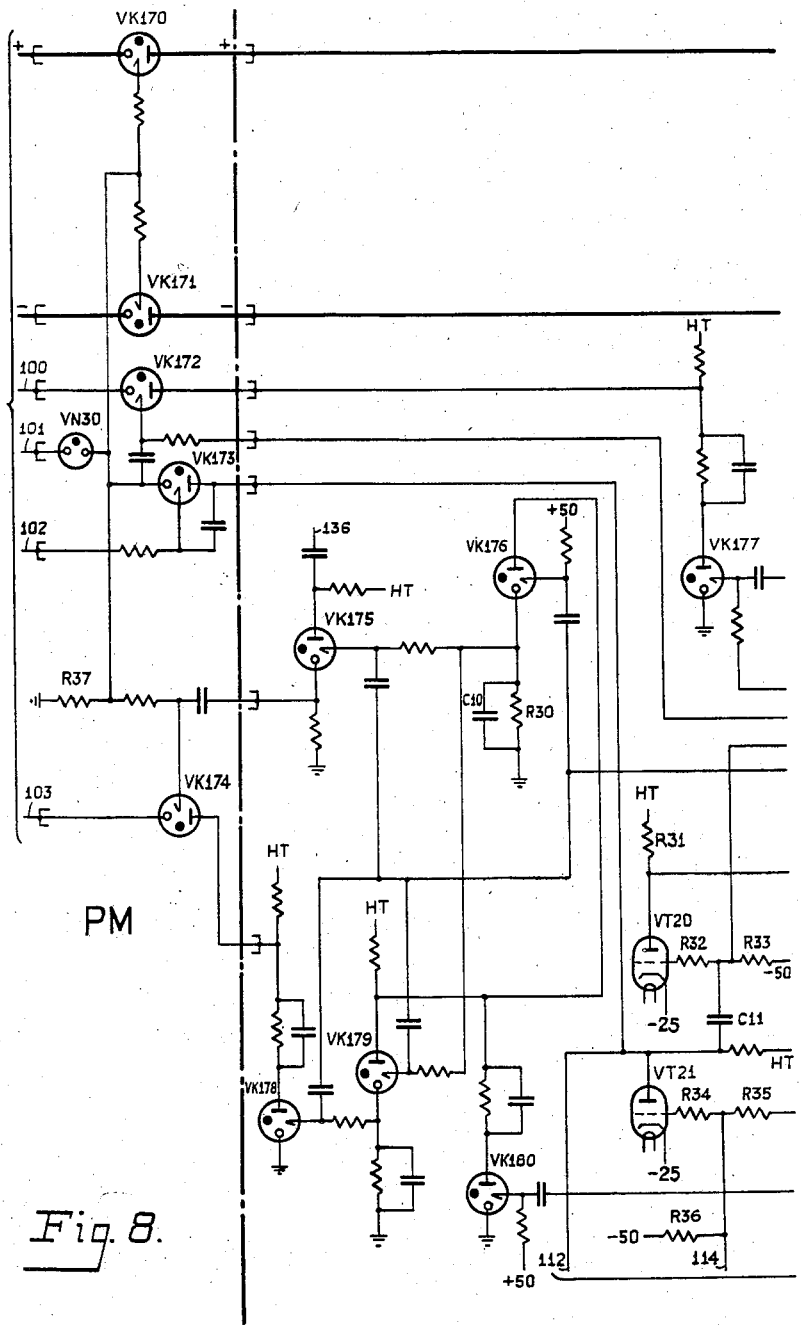
Figure 9:
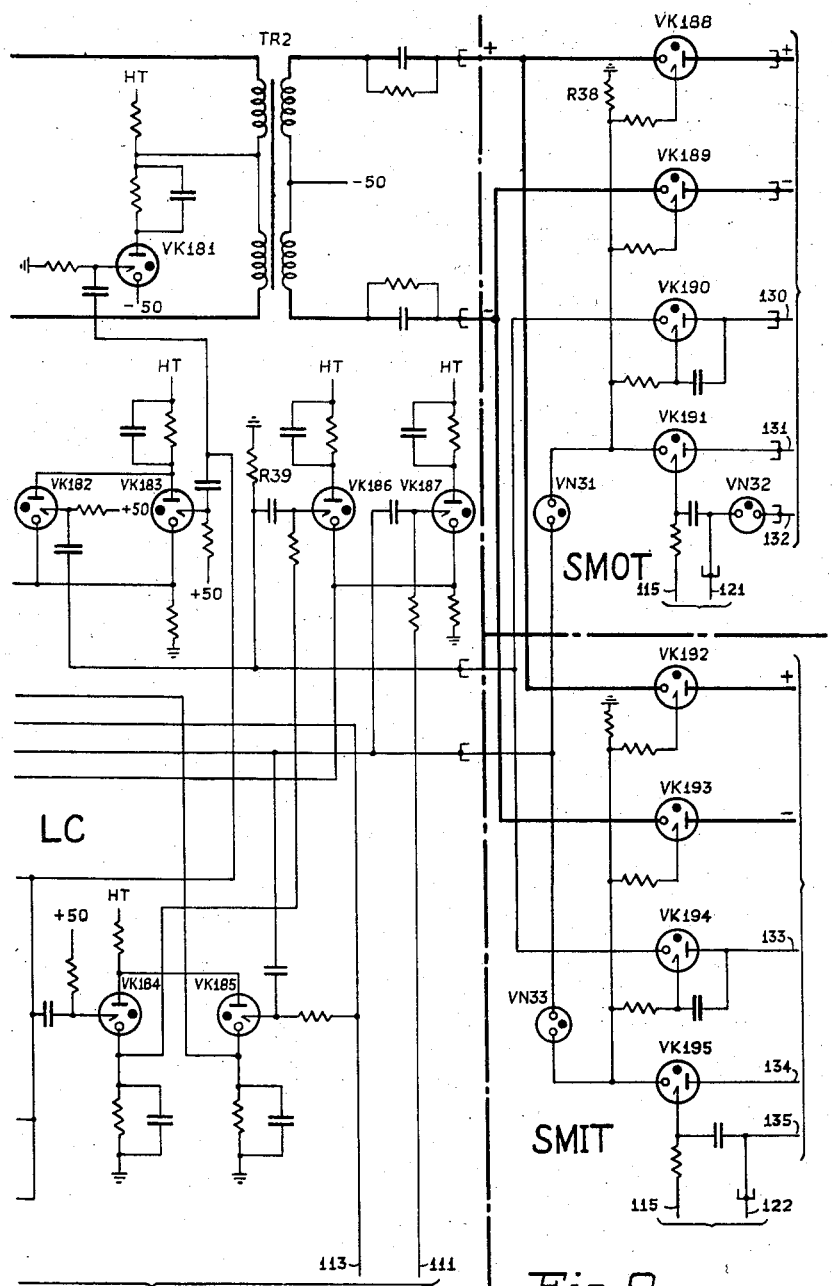
Figure 10:
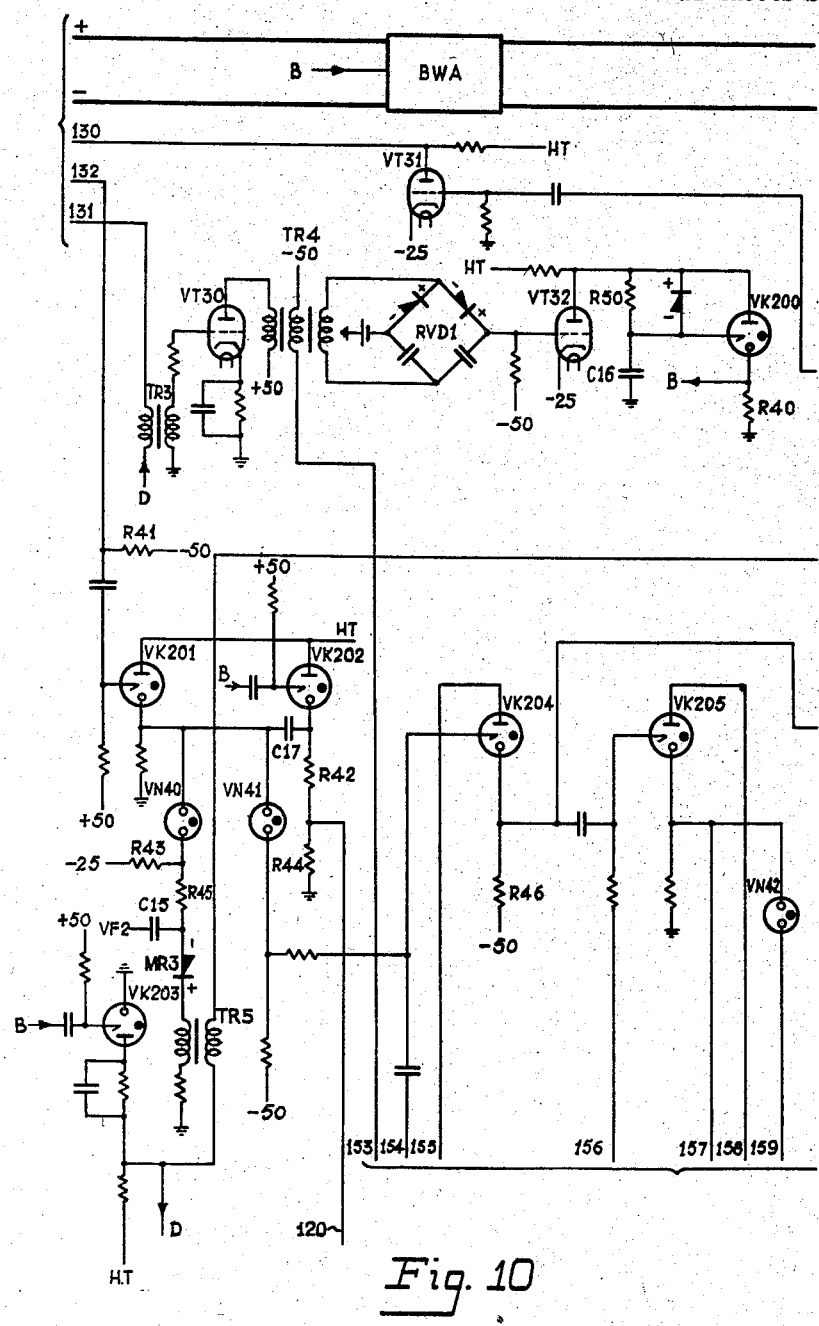
Figure 11:
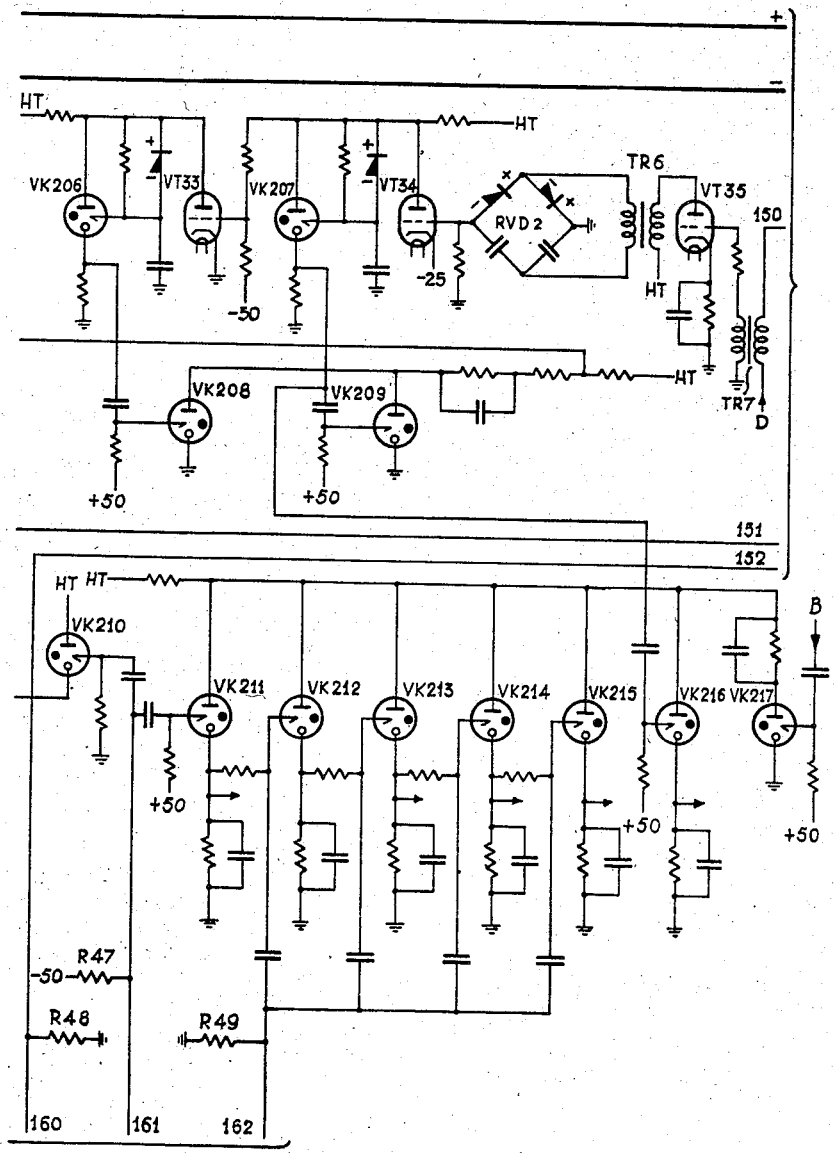
Figures 14, 17:
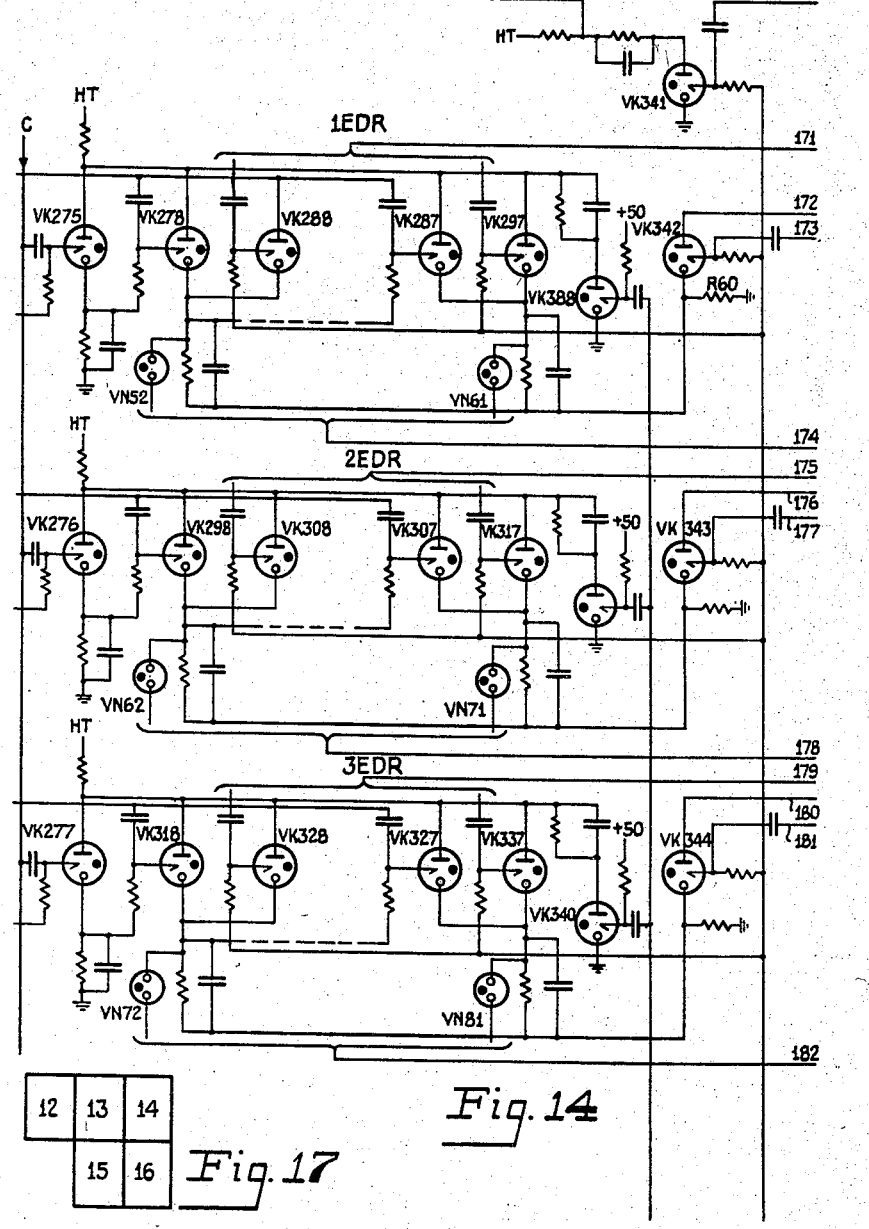
Figure 15:
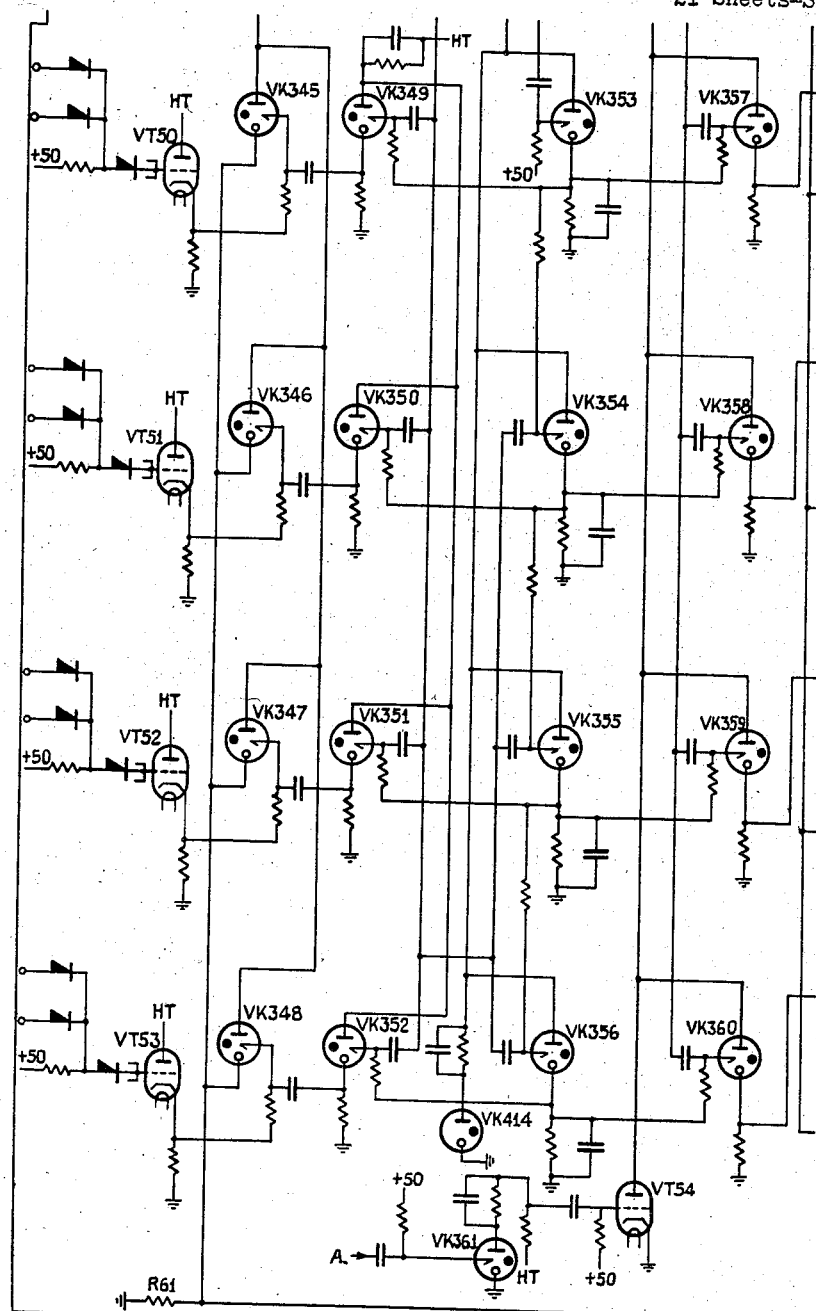
Figure 16:
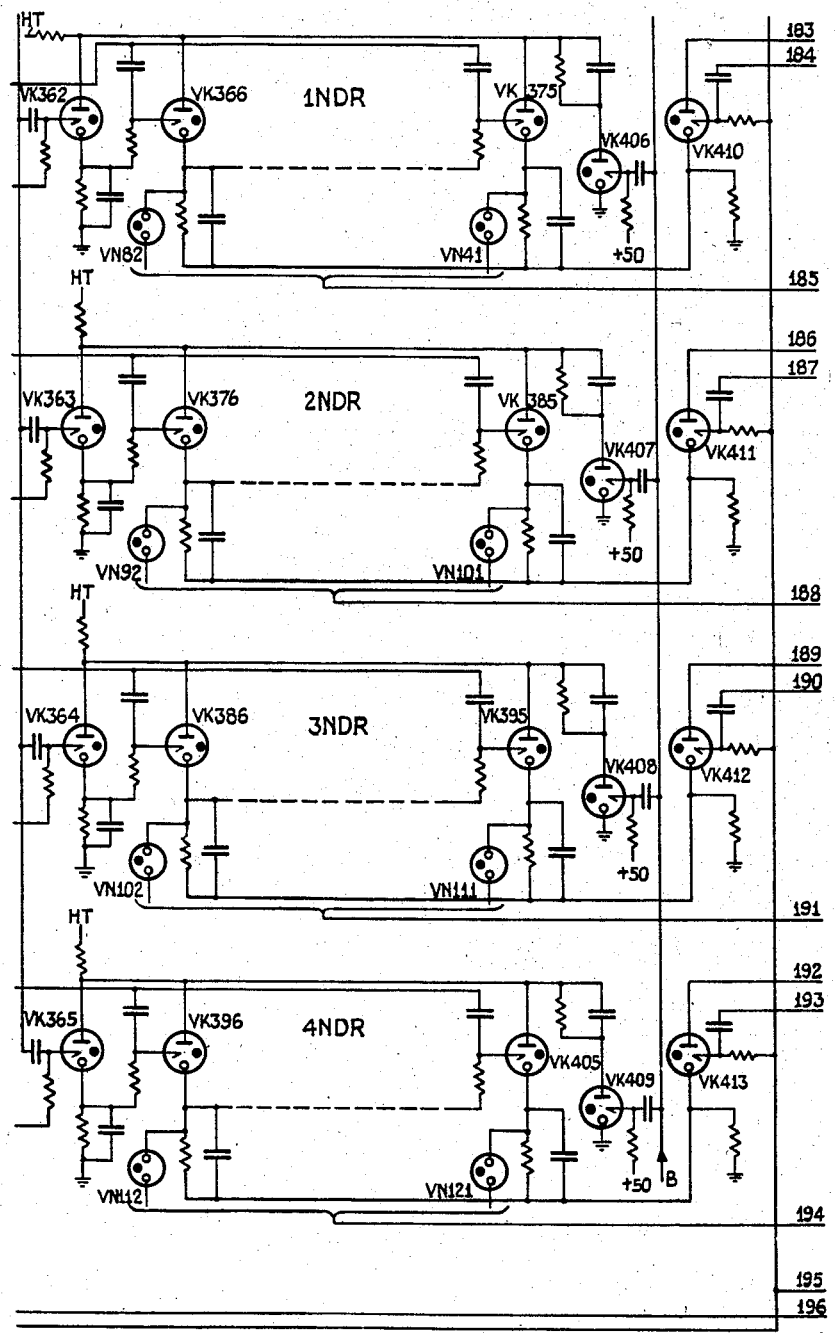
Figure 19:
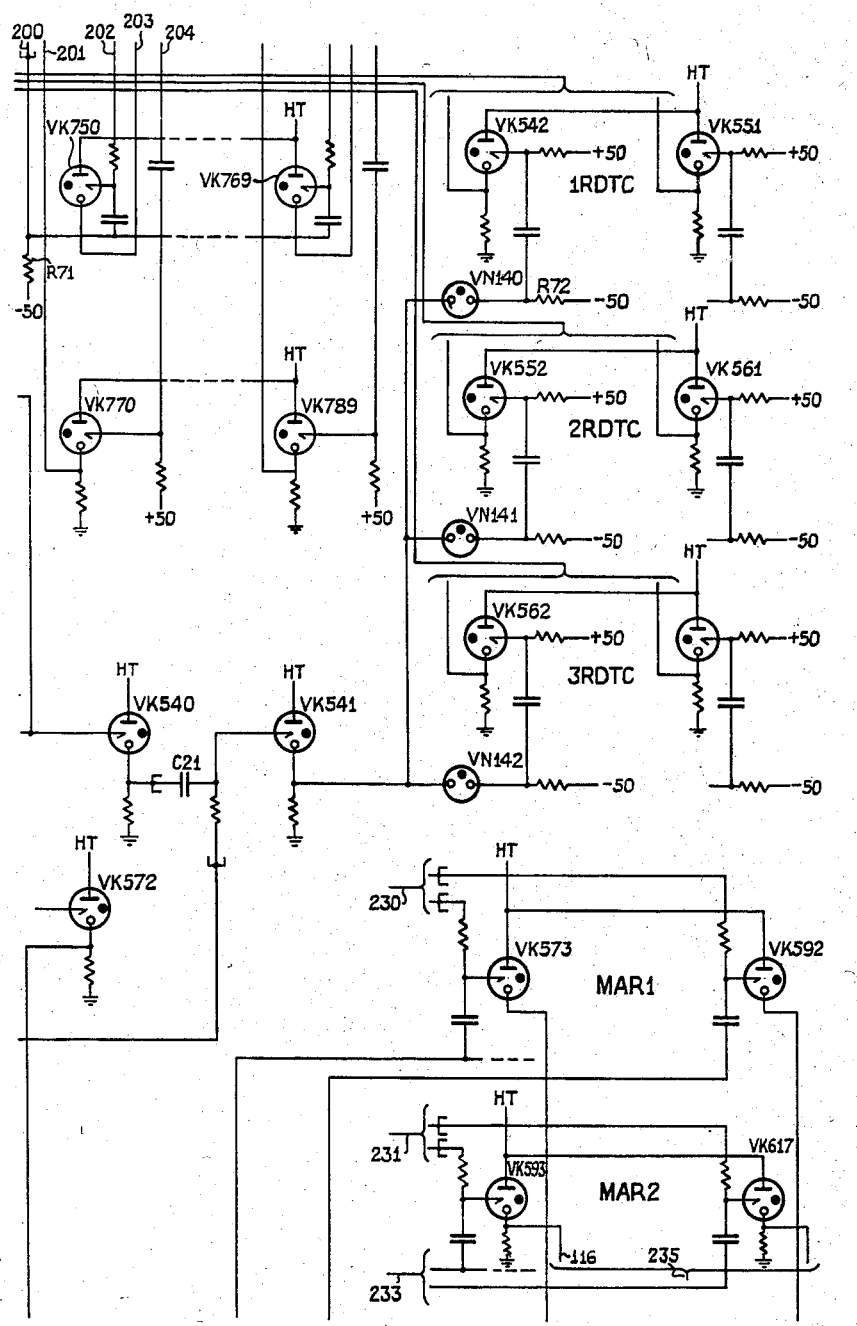
Figure 20:
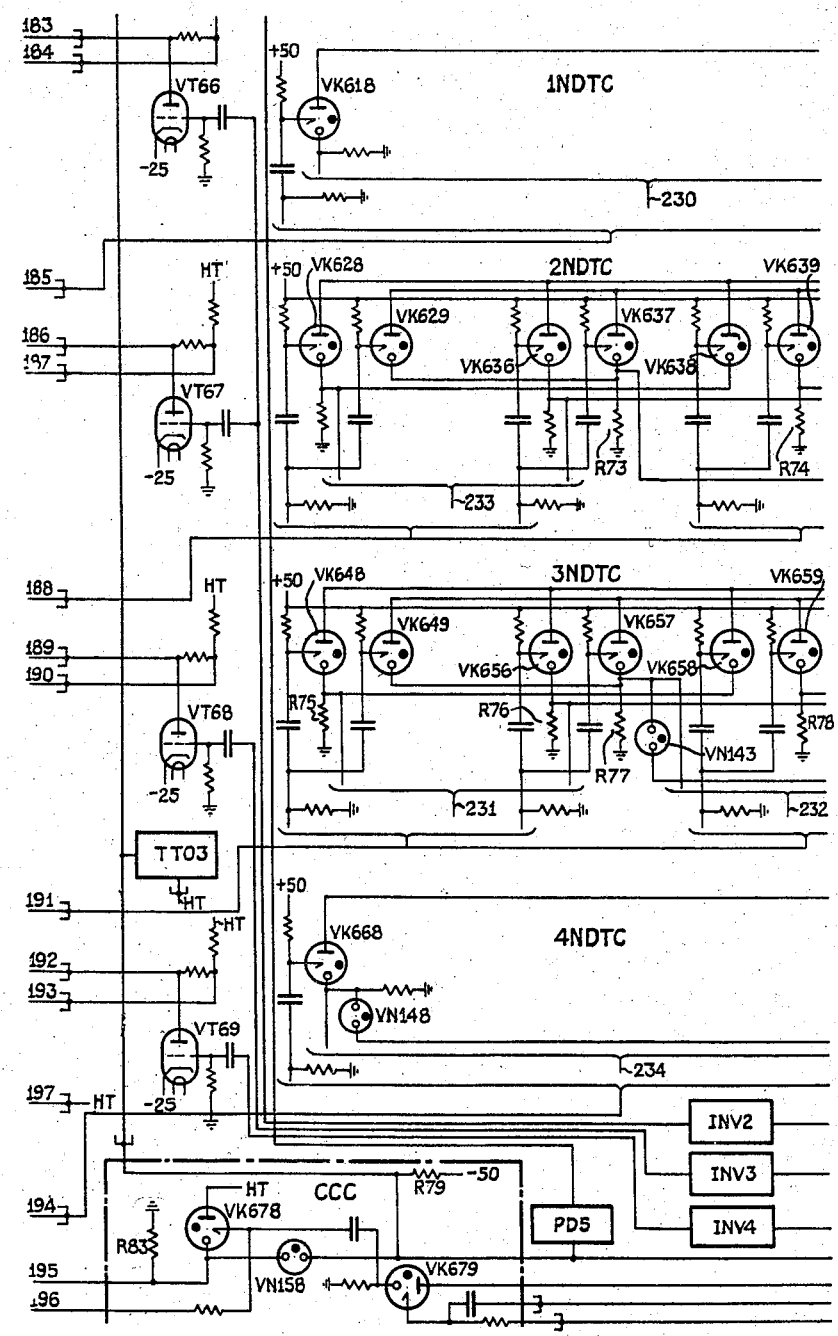
Figure 21:
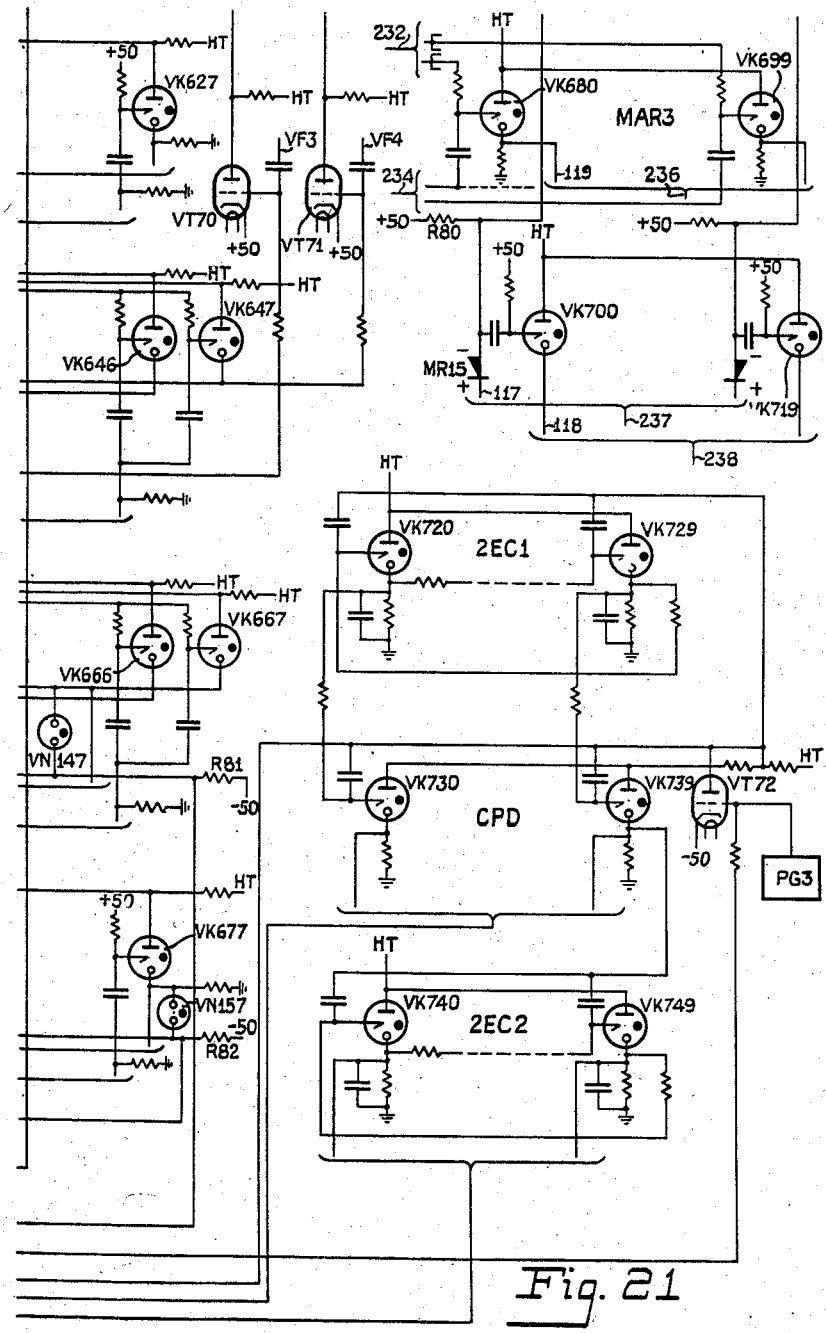
Figure 24:
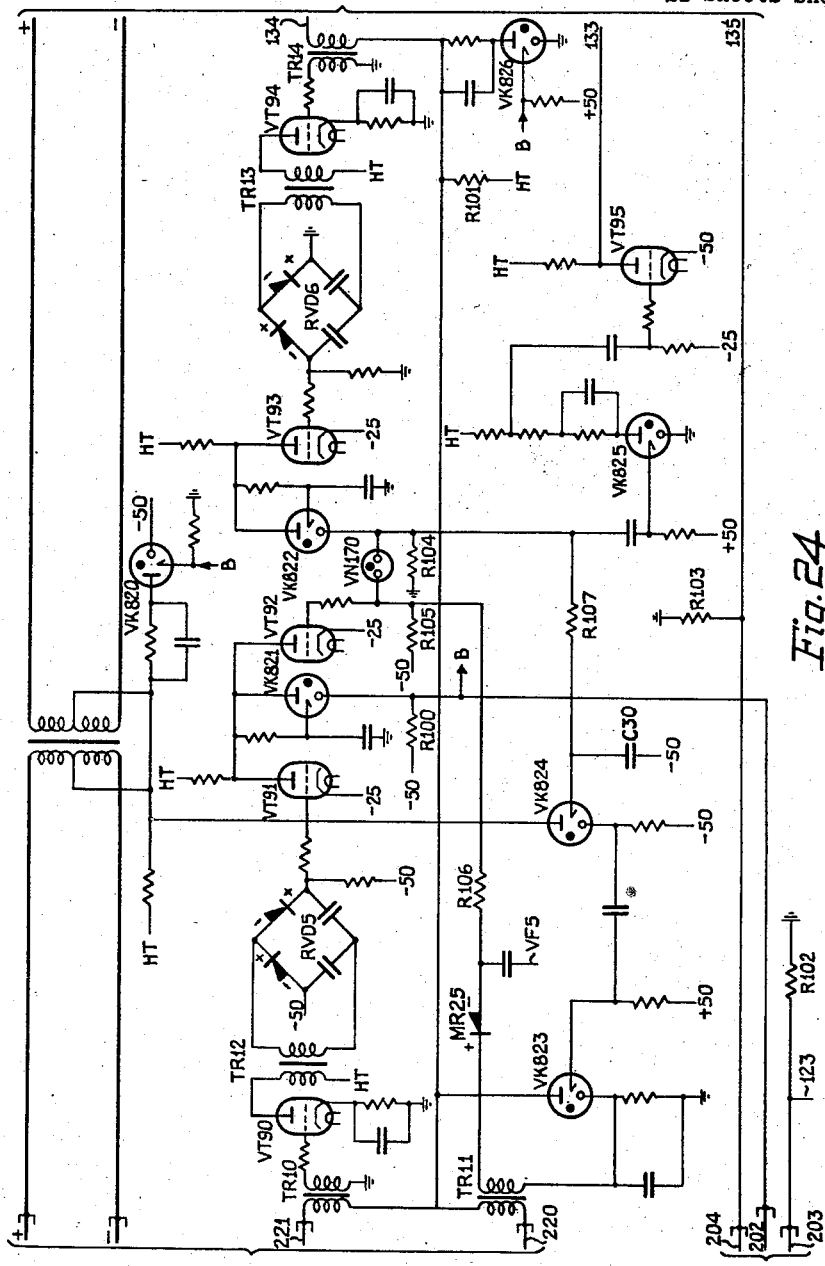

The invention will be better understood from the following description of one embodiment taken in conjunction with the accompanying drawings and comprising Figs. 1 to 24. In the drawings:

Figs. 1 and 2 show a trunking diagram of a 10,000 line exchange embodying the invention, Fig. 3 shows a subscriber's line circuit, Figs. 4 to 6 which should be arranged as shown in Fig. 7 show a line finder/final selector common control, Figs. 8 and 9 show a primary and secondary line finder/final selector and associated link circuit, Figs. 10 and 11 show an outgoing trunk connecting circuit, Figs. 12 to 16 which should be arranged as shown in Fig. 17 show a register, register connector and register common control, Figs. 18 to 21 which should be arranged as shown in Fig. 22 show a group selector common control and a common control connector, Fig. 23 shows a primary and secondary group selector and associated link circuit, while Fig. 24 shows an incoming trunk connecting circuit.

Referring first to Figs. 1 and 2 the lines in a 10,000 line exchange are in this particular embodiment divided into groups of 500 and each 500 line group is divided into 20 subgroups of 25 lines. It is, however, to be emphasized that this grouping is entirely arbitrary owing to the flexibility in the size of the electronic switching devices. For instance, it may be more convenient to use 1,000 line or 2,000 line groups.

Fig. 1 shows a partial representation of two 500 line groups of which the 1st and 20th sub-groups of the 1st group and the 20th sub-group of the 20th group are indicated. In sub-group 1 of the 1st group, the line circuits 1 and 25 are shown and in sub-group 20, the line circuits 476 and 500 are shown. In the 20th sub-group of the 20th group, the line circuits 0976 and 0000 are shown. Each group of lines has an individual common control circuit associated therewith, LCCC1 and LCCC20 being shown. Each sub-group of lines has access to one line finder/final selector primary switch of which the switches 1LF/FS1 and 1LF/FS20 for sub-group 1 and 1LF/FS400 for sub-group 20 are indicated. Each primary switch has 10 outlets or links, each of which includes a link circuit. The 200 link circuits from the 20 primary line finder/final selector circuits of a group terminate on the inlets of 10 secondary line finder/final selector circuits of which the switches 2LF/FS1 and 2LF/FS10 for group 1 and 2LF/FS200 for group 20 are indicated. Each secondary switch has 10 outlets, 5 of which are connected to outgoing trunks and 5 to incoming trunks. The interconnection between the primary switch outlets and the secondary switch inlets is effected by means of links, that is to say, outlet No. 1 from 1LF/FS1 is connected to inlet No. 1 of 2LF/FS1; outlet No. 2 from 1LF/FS1 is connected to inlet No. 1 of 2LF/FS2; outlet No. 10 from 1LF/FS1 is connected to inlet No. 1 of 2LF/FS10. Similarly outlet No. 1 from 1LF/FS20 is connected to inlet No. 20 of 2LF/FS1; outlet No. 2 from 1LF/FS20 is connected to inlet No. 20 of 2LF/FS2 and outlet No. 10 from 1LF/FS20 is connected to inlet No. 20 of 2LF/FS10.

It should be explained that the term "switches" as used in this description is used in its most general sense and that no switching mechanisms are in fact employed. The switches referred to consist of sets of gas discharge tubes, the striking of which serve to complete a speaking or signalling path between an inlet and an outlet.

The outgoing trunks from the secondary LF/FS switches extend to a group of outgoing trunk connecting circuits O/G TRS (Fig. 2) while the incoming trunks extend to a group of incoming trunk connecting circuits I/C TRS. The outgoing trunk connecting circuits O/G TRS are accessible to a plurality of register connectors of which two only RC1 and RC2 are shown and which serve to connect the relay sets through to a register REG1 and REG2. Common control equipment RCC is provided, for example, on the basis of one for every 10 registers.

It should be mentioned that the outgoing trunks from the line finder/final selectors serving different groups of lines may be suitably distributed over the same outgoing trunk connecting circuits, if desired.

The registers are also associated with a group selector common control equipment GSCCE via a common control connector CCC. The common control equipment performs a number of very important functions during the setting up of connections as will be described subsequently. The outgoing trunk connecting circuits are also connected to the inlets of primary group selector switches. As one example, a total of 100 primary switches may be provided for the exchange, each primary switch having 10 inlets and 20 outlets. The primary group selector switches are not provided individual to a particular 500 line group but are accessible to the outgoing trunk connecting circuits of all the 500 line groups, the 50 trunk connecting circuits from each 500 line group being suitably distributed over the 1000 inlets to the primary switches. The primary switch outlets are connected to links and these are distributed over the inlets of 100 secondary group selector switches. Each group selector secondary switch has 20 inlets and 20 outlets and the arrangement of the links between the primary and secondary group selector switches is the same as that between the primary and secondary LF/FS switches. Finally the 2000 outlets from the secondary group selector switches are suitably distributed over the 1000 I/C trunk connecting circuits which are connected to the I/C trunks terminating on the final selector portion of the secondary LF/FS switches as previously explained. It will be appreciated that the invention is not in any way limited to the example given above. It is, however, essential that a group selecting stage formed, in the example shown, of primary switches 1GS1 to 1GS10 and the linked secondary switches 2GS1 to 2GS10 should be entirely separate from the remaining group selecting stages, that is the links from the primary switches of a stage should go only to the secondary switches of that stage. Thus, in the example given, there would be 10 such stages.

When a subscriber, for instance, the subscriber whose line terminates on line circuit No. 1, lifts his receiver to set up an outgoing call, the primary LF/FS switch 1LF/FS1 is taken into use and all the available link circuits extending therefrom to the secondary LF/FS switches are temporarily seized. Hunting now takes place for a link circuit connected to a free outgoing trunk. This is then seized and the remaining links released. When an outgoing trunk connecting circuit is taken into use it is associated over a register connector with a register and when this operation is complete, dial tone is returned to the calling party. The calling party now dials the required number and the exchange code and numerical digits are registered on electronic storage circuits. Provision is made in the register for translating the exchange code digits, which may be one, two or three in number, into a variable number of routing digits in the case where the call is outgoing from the exchange. This translation is effected entirely by electronic means. In the case of a local digit, a signal is now sent to the group selector common control connector CCC which operates to associate the register with the group selector common control equipment GSCCE. The common control equipment then temporarily seizes all free paths through the primary and secondary group selector switches which are accessible to the seized outgoing trunk connecting circuit. The numerical digits are now transferred from the register to the common control equipment and a marking is extended from the group selector common control equipment to the line circuit common equipment of the particular 500 line group which contains the required line. It will be understood that owing to the grouping of the lines, three markings are sufficient to mark a required line whereas four numerical digits are used to define such line. A translation has therefore to be effected and this is done by electronic means provided in the group selector common control. Once the 500 line group has been selected, two other markings are extended to all the line circuit control circuits but these will be effective only on the common control of the selected 500 line group, only one call being set up at a time. Of these two markings one selects the 25 line sub-group and the second the required line in the sub-group. Assume, by way of example that the line associated with line circuit No. 0976 is the required line. The common control equipment controls the line circuit to extend it to the primary line finder/final selector 1LM/FS400, for example, which thereupon temporarily takes all the available link circuits accessible thereto. As explained above the free paths through the primary and secondary group selector switches have already been taken into use and a hunting operation now takes place to associate an available link circuit extending from a primary LF/FS switch through a secondary LF/FS switch to an incoming trunk and one side of an incoming trunk connecting circuit with an idle path extending from the selected outgoing trunk connecting circuit through the primary and secondary group selectors to the other side of the same incoming trunk connecting circuit. On the completion of this operation, the connection between the calling and called party is completed and the register and the group selector common control equipment are released. Ringing current is now transmitted to the called party and on his reply the call is metered against the calling party. The two sides of the connection are held from the incoming trunk connecting circuit which is arranged to give the last party release facility.

A detailed description will now be given of the operation of the circuits and it should be explained that in this description where reference is made to specific positive or negative voltage values, these values are given with reference to earth potential. It should also be explained that in the references on the drawings, the prefix "VN" refers to a two electrode gas discharge tube, the prefix "VK" refers to a three electrode gas discharge tube while the prefix "VT" refers to a therminonic tube.

As previously mentioned each group of 500 subscribers' lines is associated with a common control circuit shown in detail in Figs. 4 to 6. This common control circuit includes two electronic counting circuits EC1 and EC2 which operate continuously as long as none of the lines in the 500 group is in a calling condition and no call is incoming to any line of the group. The 25 point counter EC1 consists of the tubes VK97 to VK121 and is driven from a pulse source PG1, which for convenience is shown as located in the line finder/final selector common control, but which is preferably located in the group selector common control. The output from the pulse generator, which is negative-going, is applied via the tube VT10 to the trigger electrodes of the tubes of the counter EC1. The pulses inverted by the tube VT10 are also applied to the trigger electrodes of twenty tubes VK72 to VK96 forming the outgoing distributor OGD, the tubes VK72 to VK96 being primed from the corresponding tubes in the counter EC1. The output from the tubes VK72 to VK96 is fed in parallel to the trigger electrodes of tubes such as VK2 (Fig. 3) in all the 500 line circuits in such a manner that on one of the tubes VK72 to VK96 striking, a pulse is applied over a lead such as 104 and capacitor such as C3 to the VK2 tubes in all 20 line circuits whose position in the 500 line group corresponds to the position of the conducting tube in the counter EC1.

The counter EC2 consists of two sets of tubes VK10 to VK29 and VK30 to VK49. The tubes VK30 to VK49 are concerned with incoming calls and their operation will be described later. The trigger electrodes of the 25 tubes VK10 to VK29 are connected in common to the cathode resistor of the tube VK72 of the distributor OGD so that for each cycle of operation of the distributor OGD, the counter EC2 makes one step and over leads such as 106 applies a priming potential to all the tubes such as VK3 in the particular group of twenty-five lines represented by the conducting tube in the counter EC2. It will thus be seen that the continuous operation of the counters EC1 and EC2, together with the distributor OGD, enables a continuous scan to be effected of all the lines in the particular 500 line group served by the particular common control shown.

Referring now to Fig. 3, which shows the line circuit of an individual subscriber's line, it will be noted that in the absence of a loop across the line conductors, negative 50 volts is applied over the inductance IO to the trigger electrode of tube VK2 and also to the metal rectifier MR1. Under these conditions the amplitude of the pulse fed from the outgoing distributor OGD over lead 104 is insufficient to cause the tube VK2 to strike. Further the potential applied over lead 106 from the counter EC2 serves to bias the tube VK3 but this tube can only strike in response to the striking of associated tube VK2. Thus when no line is in a calling condition, the scanning operation is ineffective in causing the striking of tubes VK2 and VK3 in the line circuits and the counters operate continuously.

As regards the rectifier MR1, to which the negative 50 volts over the impedance is also applied, this rectifier acts as a gate circuit for a source of voice frequency current connected to the lead VF1. The amplitude of the voice frequency current is so selected that when the negative 50 volts is applied to the negative terminal of the rectifier, no voice frequency current is able to flow through the rectifier and capacitor C1.

Returning now to Fig. 4 it will be noted that the output from the pulse generator PG1 is also inverted by the tube VT11 over the lead 110 to provide an intermittent high tension voltage for the tube VK2 of Fig. 3. It should be mentioned that in the absence of pulses, the tubes VT10 and VT11 are fully conducting and the effect of the pulses is to cut off both tubes entirely.

Consideration will now be given to the operation of the circuit of Fig. 3 when the subscriber lifts his receiver to initiate a call and for this purpose it will be assumed that the subscriber concerned is connected to the first line circuit in the first sub-group of the first group of 500 lines. When the subscriber removes his receiver, current flows over the loop connected across the leads A and B of the line SL and the negative 50 volts on the trigger electrode of tube VK2 is replaced by a voltage which is only slightly negative with respect to earth. This voltage therefore serves to prime the tube VK2. Eventually, due to the operation of the distributor OGD in the common control, a pulse will be applied over lead 104 via capacitor C3 to the trigger electrode of tube VK2. This tube therefore strikes and remains conducting for as long as the HT supply is connected to the anode over lead 110 as previously described.

Now at this time the trigger electrode of tube VK3 may or may not be primed by the cathode voltage of tube VK10 of the counter EC2 in the common control. Assume in the first place that it is not. Then tube VK2 will be extinguished when the HT supply is disconnected from its anode without having any effect on the tube VK3. The next time tube VK10 conducts, tube VK2 will conduct again and again tube VK3 may or may not be primed. However, eventually tube VK2 will conduct at a time when tube VK3 is primed by the potential derived from the cathode of tube VK72 of the counter EC2 in the common control. Hence when tube VK2 in the line circuit conducts, the rise in cathode voltage is applied as a pulse via capacitor C2 to the trigger electrode of VK3 with the result that this tube strikes. When tube VK3 strikes, the positive cathode voltage is applied over lead 102 to the trigger electrode of tubes such as VK173 (Fig. 8) in all the sets of tubes in the line finder/final selector primary multiple PM which are associated with the calling line circuit. In addition, the positive cathode voltage of tube VK3 causes tube VN3 to strike due to the negative 50 volts on resistor R10 in the common control and also causes tube VN4 to strike due to the negative 50 volts on resistor R20 also in the common control. The rise in voltage across resistor R10 causes the negative-going output from the pulse generator PG1 to be ineffective in the anode circuit of the two tubes VT10 and VT11. The conduction of tube VT10 prevents further operation of the counter EC1, the outgoing distributor OGD and hence the counter EC2 while the conduction of tube VT11 prevents the intermittent application of the HT supply to the anodes of tubes such as VK2 in the line circuits served by the line finder/final selector common control. The positive voltage at resistor R10 is also applied to the time throw out circuit TTO1 and serves to start this circuit. Further this positive voltage causes a pulse to be applied to the trigger electrode of tube VK70 which conducts and applies a positive pulse to the trigger electrode of tube VK71 which also conducts. The positive voltage at the cathode resistor R11 of VK70 causes an increase of current flow through the rectifier MR2 and resistor R11 thus increasing the positive potential applied to lead 117 leading to the group selector common control to indicate that the line circuit common control is being used on an outgoing connection. The positive voltage at the cathode resistor R19 of tube VK71 causes a positive potential to be applied to lead 111 extending to the link circuit (Fig. 9) where it serves to prime the tube VK187.

With regard to the positive voltage developed at resistor R20 as a result of the striking of tube VN4 in the line circuit, it should be explained that a resistor such as R20 is provided in common to all the line circuits in the sub-group i.e. for each primary switch in the line finder/final selector, as indicated by the common sign associated with the lead 108. Likewise this resistor is also associated in common with all the link circuits to which the sub-group of lines which includes the calling line has access. Consequently when any line in said sub-group is in a calling condition, a positive voltage is developed at the resistor R20 and a pulse is applied to the trigger electrodes of ten tubes such as VK126, one for each link circuit accessible to said sub-group of lines.

Referring now to the link circuit (Figs. 8 and 9) tube VT20 is non-conducting when the link circuit is available. The current flow over the potential divider comprising resistors R31, R35, R36 is then such that the voltage at the junction of resistors R35 and R36 to which the lead 114 is connected is sufficiently positive to prime the associated tube VK126 in the common control so that the pulse applied to the trigger electrodes of the ten tubes such as VK126, will cause those tubes associated with idle link circuits to strike.

The striking of the tubes such as VK126 causes a positive voltage obtained from the cathode resistor R21 to be applied over lead 115 to the trigger electrodes of all the tubes such as VK191 (Fig. 9) in the outgoing secondary multiple SMOT which are connected over link circuits with the primary switch to which the calling line has access. In addition this positive cathode voltage causes the tube VN12 to strike thereby applying a pulse to the two tubes VK127 and VK128. Tubes VK127 and VK128 form a discriminating circuit, VK127 conducting on outgoing calls while VK128 conducts on incoming calls. The trigger electrode of tube VK127 is normally biased positively while the bias for tube VK128 is obtained from resistor R15. On an outgoing call, no voltage is developed across resistor R15 since tube VN10 does not strike and hence when a pulse is applied to the trigger electrodes of tubes VK127 and VK128, tube VK127 only strikes. On an incoming call, as will be described later, the positive voltage at resistor R15 primes tube VK128 and backs off tube VK127 and strikes tube VN10. Hence the pulse which is applied to the trigger electrodes causes tube VK128 only to strike. The striking of tube VK127 on an outgoing call causes a pulse to be applied to the outgoing trunk test circuits of each of the ten line finder secondary switches serving the group of 500 lines which includes the calling line. These test circuits operate to perform a hunting operation over the trunk connecting circuits or trunk relay sets which are accessible to the secondary switches 2LF/FS1 to 2LF/FS10 and to select the first idle trunk connecting circuit.

As previously mentioned, each secondary switch has access to five outgoing trunks leading to outgoing trunk relay sets so that the common control equipment will include ten test circuits each comprising five stages. In Fig. 6, one test circuit only is shown, namely the first OTTC1, and of this first and the fifth stage is shown in detail.

Referring to the test circuit, the trigger electrodes of all the tubes of which only the first VK129 and last VK133 are shown, are connected via leads such as lead 120 for tube VK129 to the associated trunk connecting circuit. In the trunk connecting circuit, one of which is shown in Figs. 10 and 11, the tubes VK201 and VK202 form a bi-stable pair of which tube VK202 is conducting when the relay set is not in use. Hence the positive voltage at the junction of R42 and R44 is applied to lead 120 and thence to the trigger electrode of the appropriate one of the tubes VK129 to VK133. Accordingly when tube VK127 in the common control strikes, those of the tubes VK129 to VK133 of which the associated trunk connecting circuits are available, will also strike. A diode such as VN15 or VN19 is associated with the cathode of the tubes VK129 to VK133 respectively and strikes when the associated tube strikes. The resistor R18 is common not only to the tubes VN15 to VN19 but also to similar diodes in the other nine test circuits in the common control equipment. Consequently, when any of the tubes VK129 to VK133 or any one of the similar tubes of the remaining nine test circuits strike, a positive voltage will appear on the common resistor R18 and this positive potential will be applied to the delay circuit PD2. The delay pulse from this circuit will be applied to the trigger electrodes of tubes VK134 and VK139. Tube VK134 is one of five tubes VK134 to VK138 of which the first and last only are shown for convenience. Now the cathode resistor of tube VK129 has a portion R16 which is also connected in the cathode circuit of tube VK134 so that if tube VK129 is conducting, tube VK134 is backed off and will not strike when the pulse is applied thereto from the delay circuit PD2. On the other hand the positive voltage on cathode resistor R16 provides a priming potential for the tube VK139 to which the pulse from the delay circuit PD2 is also applied. This tube therefore strikes if tube VK129 is conducting and applies a positive potential from cathode resistor R17 over lead 121 extending to the trigger electrodes of tubes such as VK191 (Fig. 9) of the sets of tubes in the secondary switches having access to the outgoing trunk represented by tube VK129.

If, however, the trunk connecting circuit is unavailable, earth will be returned over lead 120 to trigger electrode of tube VK129 so that this tube will not strike on receipt of a pulse from a tube VK127. Consequently when the delayed pulse is obtained from PD2 as previously described, tube VK134 strikes but tube VK139 will not strike since no priming potential is available. The striking of tube VK134 applies a pulse to the striking electrode of the next pair of tubes in the series and this will strike if the corresponding tube such as VK129 is not conducting. This operation will continue until the set of tubes corresponding to an idle trunk connecting circuit is found and it will be noted if none of the five trunk connecting circuits associated with the test circuit shown are available, the positive potential from the cathode of the tube VK138 will be applied to the trigger electrode of the tube corresponding to tube VK134 in the next test circuit, so that a test is made of the trunk relay sets represented by the second trunk test circuit.

Assuming, however, that the trunk connecting circuit associated with tube VK129 is available, then tube VK139 strikes as previously described and applies a pulse to tubes such as tube VK191 of the sets of tubes of the secondary switch 2LF/FS1 which are associated with the available trunk connecting circuit. Now as previously mentioned, a priming potential has already been applied from the cathode of tube VK126 to tubes such as VK191 of the sets of tubes in the secondary switches 2LF/FS1 to 2LF/FS10 to which the calling line has access and it will thus be seen, from a consideration of the trunking diagram of Fig. 1, that only one of these tubes, namely tube VK191 shown in Fig. 9 will strike in response to the pulse from the cathode of tube VK139.

Tube VK191 therefore strikes, resistor R38 being the cathode resistor. The positive cathode voltage of tube VK191 is thus applied to the tubes VK188 and VK189 so that these tubes also strike and tube VK190 is primed. Further this positive cathode voltage causes tube VN31 to strike whereby the voltage at the junction of resistors R32 and R33 goes positive to a sufficient extent to cause the thermionic tube VT20 to conduct. The anode voltage of tube VT20 is thus reduced and the potential applied to lead 114 goes negative thereby busying the link circuit by removing the priming potential from the associated tube such as VK126 (Fig. 5) in the common equipment.

As a further result of the striking of VN31, a pulse is applied to the pulse repeater tube VK187, this tube being primed over lead 111 from the cathode resistor R19 of tube VK71 in the common equipment as previously described. Tube VK187 is thus struck and its positive cathode voltage serves to pulse tube VK176 which strikes. The positive cathode voltage of tube VK187 is also applied as a pulse to the trigger electrodes of tubes VK175, VK178 and VK179 but is without effect at this time, the priming potential for tubes VK175 and VK179 being dependent on the cathode voltage of tube VK176. Tubes VK175 to VK179 are concerned with the metering of the call and their further operation will be described subsequently.

When the thermionic tube VT20 conducts as previously described, tube VT21 is cut off since the voltage at the junction of R35 and R36 goes negative. The anode voltage of VT21 thus goes positive and a positive pulse is applied to the trigger electrodes of tubes such as tube VK173 of the primary switch 1LF/FS1 which is associated with the link circuit shown. Only one of these tubes strikes, however, namely that one, VK173, which has been primed as previously described over lead 102 by the positive cathode voltage of tube VK3 in the calling subscriber's line circuit. Tube VK173 strikes and its positive cathode voltage developed across resistor R37 causes tubes VK170 and VK171 to strike and tube VK174 to be primed. Further the positive voltage across R37, causes tube VN30 to strike in series with resistor R1 in the calling subscriber's line circuit. This positive voltage is applied to the cathode of the tube VK2 in the line circuit whereby this tube is prevented from striking in response to a pulse over lead 104 from the common control when the scanning operation again begins. In the absence of this backing-off effect tube VK2 would strike during the scanning operation since the calling condition is still present.

As a further result of the cutting off of the thermionic tube VT21, a positive pulse is applied over lead 112 to the trigger electrode of tube VK125 in the common equipment (Fig. 4). This tube, which is individual to the seized link circuit, strikes followed by tube VN11 which is also individual to the link circuit whereby a pulse is applied to the trigger electrode of tube VK124. This tube strikes and applies a pulse to the reset circuit RS1 which in turn applies a positive voltage for a predetermined period to the voltage stabilising circuit VSC. This causes a reduction in the anode voltage applied to tubes VK70 and VK71 in the common equipment, to tube VK3 in the calling subscriber's line circuit and to all tubes such as tube VK126 in the common equipment. Tubes VK70, VK71 and VK3 are thus extinguished together with all tubes such as VK126 associated with available link circuits which were struck as previously explained. Tubes VN3 and VN4 in the line circuit are extinguished following the extinguishing of tube VK3, and when VN3 is extinguished, it allows pulses from the pulse generator PG1 to be inverted through the tube VT10 to the outgoing distributor OGD and counter EC1. The scanning of the line circuits thus begins again but will be ineffective as regards the calling line circuit for the reason previously mentioned.

Further, when tube VK3 in the calling subscriber's line circuit is extinguished, positive priming potential is removed from lead 102 and hence from the trigger electrodes of the tubes such as VK173 in the primary switches to which the calling line has access. Also when tube VK126 is extinguished positive potential is removed from lead 115 and hence from the trigger electrodes of the tubes such as VK191 in the outgoing secondary switches connected over the links to the primary switches which were temporarily taken into use.

The subscriber's line circuit is now extended through the transformer TR1, tubes VK170 and VK171 of the line finder/final selector primary switch, transformer TR2 and tubes VK188 and VK189 of the line finder/final selector secondary switch to the outgoing trunk connecting circuit (Figs. 10 and 11). The positive pulse which was applied to lead 121 (Fig. 9) to cause the striking of tube VK191 of the secondary switch also strikes tube VN32 which is connected over lead 132 to resistor R41 (Fig. 10). The positive voltage appearing at the left-hand end of resistor R41 causes the striking of tube VK201 of the bi-stable pair, thus causing tube VK202 to be extinguished. The positive voltage obtained from the junction of resistors R42 and R44 is thus removed from lead 120 and hence from the trigger electrode of tube VK129 in the common equipment thereby busying the trunk circuit. Also tube VK201 in striking causes tubes VN40 and VN41 to strike, tube VN40 opening the voice frequency gate comprising resistors R43 and R45 and rectifier MR3 thus allowing voice frequency current from a source connected to lead VF2 to flow through capacitor C15, rectifier MR3 and the primary winding of transformer TR5. The secondary winding of transformer TR5 is connected to lead 151 extending to the group selector primary switch.

Figure 12:
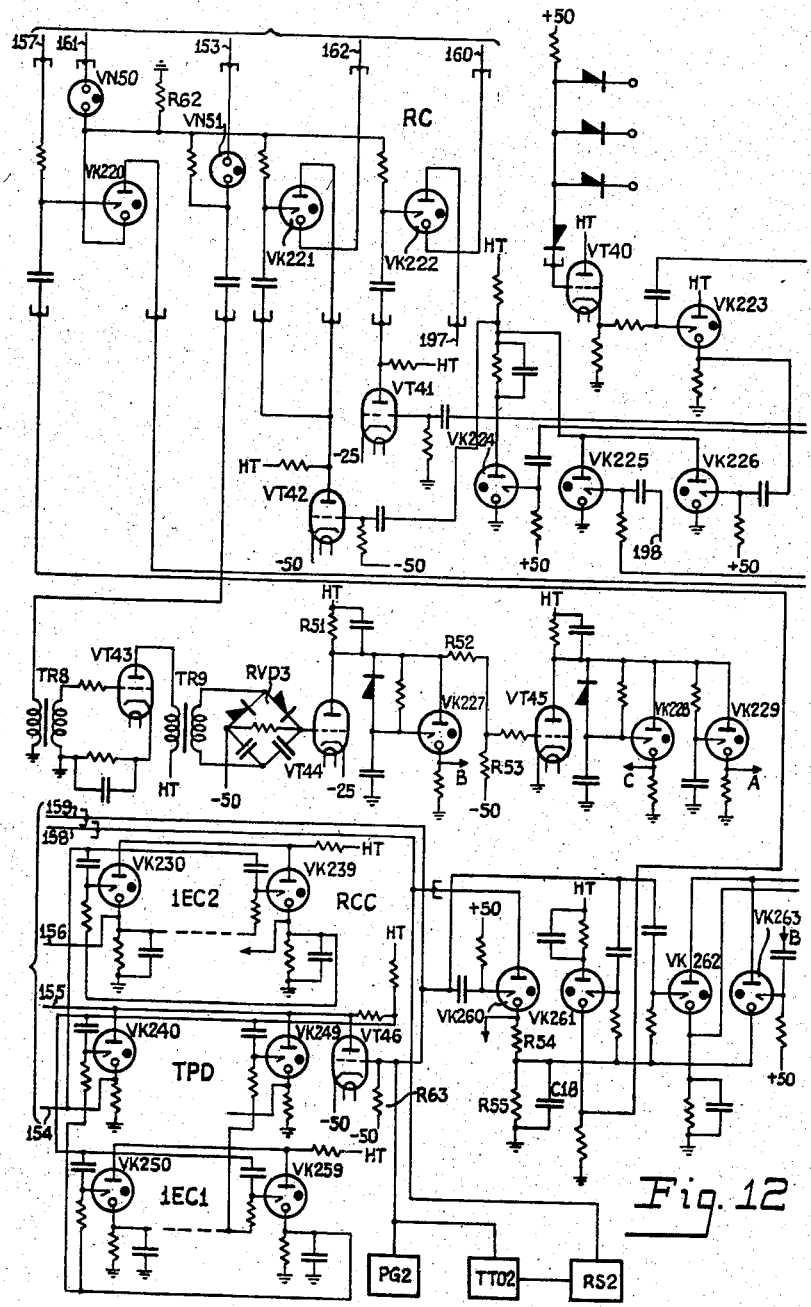
Figure 13:
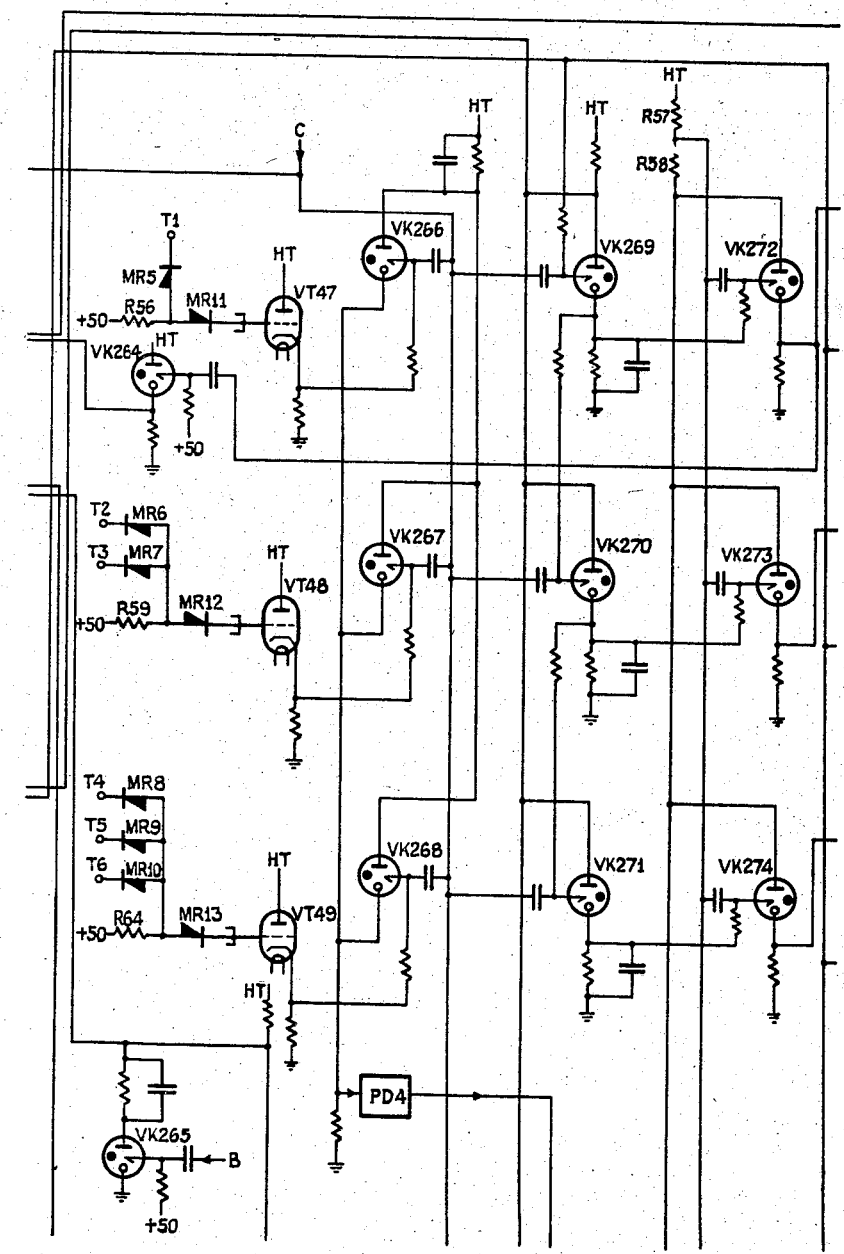

When tube VN41 strikes, a priming potential is applied to the trigger electrode of tube VK204. Tubes VK204 and VK205 are arranged in a similar manner to tubes VK2 and VK3 in the line circuit and are controlled over leads 154 and 156 from two electronic counters in the register common control RCC (Fig. 12). As previously explained the register common control serves ten registers and 100 trunk connecting circuits and when a trunk connecting circuit is taken into use, the register common control operates to associate the trunk connecting circuit with an idle register.

Consequent upon the striking of tubes VK173 and VK191 in the line finder/final selector primary and secondary switches, voice frequency current from the source connected to lead VF1 in the subscriber's line circuit flows over lead 101, tube VN30, tube VK173, capacitor C11, tubes VN31 and VK191, lead 131 and the primary winding of transformer TR3 in the outgoing trunk connecting circuit. This current is applied through the secondary winding to the grid of the amplifier tube VT30, the anode circuit of which includes a transformer TR4 having two secondary windings of which one feeds the rectifying and voltage doubling network RVD1. The output of the nework RVD1 is connected to the control grid of the thermionic tube VT32 which is normally non-conducting due to the negative bias applied to the control grid thereof. Under these conditions, therefore, tube VK200 is conducting because the full value of the HT voltage is available at its anode. When the voice frequency current is received from the subscriber's line circuit, the positive-going output from the network RVD1 causes tube VT32 to conduct whereupon tube VK200 is extinguished. A delay circuit consisting of capacitor C16 and resistor R50 is associated with the trigger electrode of VK200 in order to delay the striking of the tube when the thermionic tube VT32 is subsequently cut off and the delay is such that tube VK200 does not again conduct until a prolonged interruption in the transmission of the voice frequency current occurs. The tube VK200 is concerned with the release of the connection as will be later described in detail. The other secondary winding of the transformer TR4 is connected to lead 153 extending to the register connector RC (Fig. 12) for a purpose which will be described later.

Referring now to the register shown in Figs. 12 to 16 two counters 1EC1 and 1EC2 consisting of ten tubes VK250 to VK259 and VK230 to VK239 respectively, and a pulse distributor TPD consisting of ten tubes VK240 to VK249 forming part of the register common connecting circuit RCC are connected in a similar manner to the tubes of the counters EC1 and EC2 and the pulse distributor OGD in the line finder/final selector common control. The counter 1EC1 is driven from a 400 pulse per second pulse generator PG2 through a thermionic tube VT46 which is normally fully conducting. The pulses are repeated from the anode circuit of tube VT46 to the counter EC1 and to the pulse distributor TPD while the striking of a tube in the counter serves to bias the next tube in the counter and in the pulse distributor. The trunk connecting circuits are numbered from 01 to 99 and when a tube in the pulse distributor TPD strikes, a pulse is applied over a lead such as 154 to the trigger electrode of a tube such as VK204 in the trunk relay sets whose units digit corresponds with the tube which has been struck in the pulse distributor. Further each time tube VK240 in the pulse distributor conducts, a pulse is applied to the tubes in the counter 1EC2 and that one which is primed strikes. The striking of a tube in the counter 1EC2 applies positive potential to a lead such as 156 and thence to the trigger electrode of a tube such as VK205 in the trunk connecting circuits whose tens digit corresponds with the tube which has been struck in the counter EC2. The trunk connecting circuits are thus scanned in a similar way to that described for the line circuits.

When the trunk connecting circuit shown is taken into use as previously described, tube VK204 is primed and eventually tube VK205 will also be primed from the register common control RCC. Hence when a pulse is next applied to lead 154, tube VK204 strikes and applies a pulse to tube VK205 which also strikes. The positive cathode voltage of tube VK205 causes a positive potential to be applied to lead 157 and thence to the trigger electrode of tube VK220 in the register connector RC. This positive potential in addition causes tube VN42 to strike to resistor R63 (Fig. 12) whereby tube VT46 in the common control is biased so that no further pulses are transmitted to the counter 1EC1 and distributor TPD. Further the conducting of tube VT46 at this stage extinguishes the conducting tube in the distributor TPD and also tube VK204 in the outgoing trunk connecting set by reducing its anode voltage. The positive potential on resistor R63 also causes a pulse to be applied to the time throw-out circuit TTO2 and to the trigger electrode of a tube VK260 in the register common control RCC and to the trigger electrode of tubes VK261 and VK262 which are individual to the register shown, say, the first register of the ten served by the register common control. The register common control includes ten tubes such as VK260, one for each register, the ten tubes being arranged in a chain circuit, the cathode of the first being connected to the trigger electrode of the second and so on. If the register shown is idle, tube VK263 will be conducting, resistor R55 being common to the cathode circuits of both tubes VK260 and VK263. The cathode circuit of tube VK260 consists of resistors R54 and R55 and the values of the resistors are such that the voltage at the junction of these two resistors when tube VK263 is conducting is sufficient to prevent tube VK260 striking in response to the pulse applied to the trigger electrode from lead 159. The slow build-up of potential at the cathode of tube VK260 due to capacitor C18 will not be transmitted to the striking circuit of the next tube similar to VK260 in the chain when tube VK263 initially becomes conducting.

Hence when tube VK263 is conducting, indicating that the register is free, tubes VK261 and VK262 strike in response to the pulse from lead 159 since their trigger electrodes are primed from resistor R55. Tube VK263 is thus extinguished due to its common anode supply with tube VK262. The register is now unavailable and a later pulse on lead 159 is passed on to the next tube similar to tube VK260 in the chain. Further the positive cathode voltage of tube VK262 is applied as a priming potential to the trigger electrode of tube VK269 and also to the trigger electrodes of tubes VK275 to VK277 and VK362 to VK365. Tube VK261 is a self-extinguishing pulse repeater tube and when it strikes it applies a pulse to the trigger electrodes of tubes similar to tube VK220 in the register connector RC. This tube has been primed over lead 157 from the trunk relay set as previously described and therefore strikes. The voltage developed across cathode resistor R62 of tube VK220 serves to strike the tube VN50 over lead 161 and resistor R47. This causes tubes VK210 and VK211 in the trunk connecting circuit to strike, the former having a common cathode resistor R46 with tube VK204. The positive voltage at the cathode end of resistor R46 serves to back off tube VK204 so that this tube is unaffected by pulses applied to its trigger electrode when the counters 1EC1 and 1EC2 in the register common control operate again. Tube VK211 in conducting serves to prime tube VK212 and also applies a positive potential to a tone transmission network (not shown) whereby dial tone is transmitted to the calling subscriber.

The voltage developed across resistor R62 on the striking of VK220 in the register connector as described previously also serves to strike tube VN51 which is connected by lead 153 and the centre winding of transformer TR4 in the trunk relay set to negative 50 volts. Finally the voltage across resistor R62 primes tubes VK221 and VK222 in the register connector. When tube VN51 strikes, a path is completed from the centre winding of transformer TR4 in the trunk connecting circuit to the primary winding of transformer TR8 in the register. Hence the voice frequency current incoming over lead 131 is fed through the centre winding of transformer TR4 to the primary winding of transformer TR8. The secondary winding of transformer TR8 is in the input circuit of the thermionic amplifying tube VT43, the anode circuit of which includes the primary winding of the transformer TR9. The secondary winding of transformer TR9 is connected to the rectifying and voltage doubling network RVD3 by which the voice frequency current is rectified and voltage doubled and applied to the control grid of the normally non-conducting thermionic tube VT44. This tube together with the tube VK227 behaves in a similar manner to the tubes VT32 and VK200 in the trunk connecting circuit, that is to say tube VK227 is normally conducting and when the voice frequency current is received and VT44 conducts, tube VK227 is extinguished. Further a delay arrangement is included in the circuit of the trigger electrode of tube VK227, the time constant of the delay circuit being such that tube VK227 only strikes again in response to a prolonged interruption in the flow of voice frequency current. The anode of tube VK227 is connected to a point on a potential divider comprising resistors R51, R52 and R53 connected between the HT supply and negative 50 volts while the control grid of thermionic tube VT45 is connected to the junction of R52 and R53 i.e. at a more negative point than the anode of tube VK227. The values of the individual resistors forming the potential divider are such that the voltage applied to the control grid of tube VT45 when tube VT44 is conducting is sufficiently negative with respect to the cathode to cut off tube VT45 while when tube VT44 is non-conducting and tube VK227 is conducting the potential on the control grid of tube VT45 is sufficiently positive with respect to the cathode to allow tube VT45 to conduct. In the absence of voice frequency current, therefore, tube VT45 is conducting and tubes VK228 and VK229 are non-conducting. When voice frequency current is received, tube VT44 conducts, tube VK227 is extinguished and tube VT45 is cut off, thus allowing tubes VK228 and VK229 to strike, the former after a delay of approximately 150 millisecs. When tube VK228 eventually strikes, it applies a pulse which will be designated a "C" pulse to the various correspondingly referenced leads in the circuit of the register. In particular it applies a C pulse to the trigger electrodes of the tubes of the digit sequence counter comprising tubes VK269 to VK271 and VK353 to VK356. Only the first of these, VK269, is primed from the cathode of VK262 and hence it is the only one to strike. The C pulse is also applied to the trigger electrodes of tubes VK275 to VK277 and tubes VK362 to VK365. These tubes, which were also primed from the cathode of VK262 strike and serve to apply a priming potential to the trigger electrodes of the first tubes in the exchange digit registers 1EDR to 3EDR and the numerical digit registers 1NDR to 4NDR. Tube VK269 in striking primes tube VK272 and also extinguishes tube VK262 owing to the common anode supply. When tube VK262 is extinguished, the priming potential is removed from the trigger electrodes of tubes VK275 to VK277 and tubes VK362 to VK365. It should also be mentioned that when tube VK229 strikes on the cutting off of tube VT45, a pulse which will be designated an "A" pulse is applied to all the similarly referenced leads in the register, but in this particular instance the A pulse is without effect.

The calling subscriber now begins to dial the number of the wanted subscriber and in this connection it should be explained that the register is arranged to deal with a maximum of three exchange digits and four numerical digits but it may be modified to deal with a lesser number of exchange and numerical digits, if desired.

On the first interruption of the calling subscriber's line, the potential at the junction of resistors R3 and R4 (Fig. 3) will go negative, thus closing the voice frequency gate circuit so that the flow of voice frequency current through the rectifier MR1 and capacitor C1 to lead 101 and thence to lead 131 is interrupted. In the trunk connecting circuit, cessation of voice frequency current causes tube VT32 to be cut off but tube VK200 does not immediately strike owing to the delay circuit associated with the trigger electrode as previously described. In fact, the time constant of this delay circuit is such that tube VK200 does not strike when the current flow is interrupted only for the break period of the impulse cycle. The interruption in current flow over lead 131 also causes the interruption of current flow through the centre winding of transformer TR4, lead 153, tube VN51 and primary winding of transformer TR8. Tube VT44 in the register is thus cut off but tube VK227 does not strike as its delay circuit has a time constant substantially the same as that of tube VK200. The thermionic tube VT45, however, conducts whereby tubes VK228 and VK229 are extinguished. At the end of the break period of the first impulse cycle, voice frequency current again flows and tube VT32 in the trunk connecting circuit and tube VT44 in the register both conduct again and this conduction takes place before either of tubes VK200 and VK227 have had time to strike. In the register tube VT45 is cut off and tube VK229 strikes but tube VK228 does not due to the delay circuit associated with the trigger electrode. The time constant of this circuit is sufficient to prevent VK228 from striking during the make period of an impulse cycle. It will thus be seen that the transmission of dialled digits is effected by interrupting the flow of voice frequency current from the line circuit to the register, each impulse cycle causing tube VK229 to conduct for the duration of the make period. Each time tube VK229 strikes the positive cathode voltage is applied as an "A" pulse to the trigger electrode of the pulse repeating tube VK361 (Fig. 15) which momentarily cuts off the thermionic tube VT54. When tube VT54 is cut off, the potential at the junction of anode resistors R57 and R58 (Fig. 13) goes positive and a positive pulse is applied to the trigger electrodes of tubes VK272 to VK274 and VK357 to VK360. Of these tubes, VK272 has been primed from the cathode of tube VK269 and therefore strikes but none of the other tubes have been primed so that these tubes do not strike. Tube VK272 in striking applies a positive pulse to the trigger electrodes of tubes VK278 to VK287 of the first exchange digit register 1EDR. This register consists of ten stages, each stage consisting of a pair of tubes such as VK278 and VK288 having a common cathode resistor. A digit is registered by the sequential striking of the tubes VK278 to VK287 in response to pulses applied to the trigger electrodes of all the tubes from the cathode of tube VK272. The purpose of the tubes VK288 to VK297 will be described later.

Thus when tube VK272 strikes on the first impulse of the first exchange digit, it causes the first tube VK278 in the first exchange digit register 1EDR to strike, this tube having been primed on the striking of tube VK275 as previously described. Further the striking of tube VK278 causes tube VK275 to be extinguished owing to the common anode supply. It will be understood that the thermionic tube VT54 is only cut off for a short period in response to an A pulse and when it again conducts, tube VK272 is extinguished since tubes VT54 and VK272 have a common anode supply. The second A pulse therefore causes tube VK272 to conduct again thereby applying a second pulse to the trigger electrodes of the tubes in the register 1EDR. Tube VK279 (not shown) therefore strikes and extinguishes tube VK278 and subsequent impulses are registered in a similar way.

It will be noted that the first pulse obtained from the cathode of tube VK272 is also applied to the trigger electrode of tube VK264 which strikes and applies a pulse to the pulse repeating tube VK224. The latter tube in conducting applies a negative-going pulse to the control grid of the normally conducting thermionic tube VT42. The tube VT42 is thus cut off for the duration of the pulse thereby causing tube VK221 to strike over lead 162 to resistor R49 in the trunk connecting circuit, this tube having been primed on the striking of tube VK220 as previously described. Tube VK221 in striking applies a positive pulse to the trigger electrodes of tubes VK212 to VK215 in the trunk connecting circuit (Fig. 11). Of these tubes, tube VK212 is primed from the cathode of tube VK211 and hence strikes thereby extinguishing tube VK211 whereby the positive potential is removed from the tone transmission network and the transmission of dial tone to the calling party is terminated.

At the termination of the first series of impulses representing the first exchange digit, tube VT45 in the register will be cut off and tube VK228 will strike at the end of its delay period, thereby applying the C pulse again to the various leads in the register. In this instance tube VK270 will strike as it has been primed from the cathode of tube VK269 and the latter tube is extinguished when tube VK270 strikes. When tube VK269 is extinguished the priming potential is removed from tube VK272 and a priming potential is applied to tube VK273 from the cathode of tube VK270. As regards tubes VK275 to VK277 and VK362 to VK365, they will be unaffected by the C pulse since priming potential was removed from their trigger electrodes when tube VK262 was extinguished as previously described. Tube VK275, which was extinguished when the first digit was stored in the first digit register 1EDR does not therefore strike again but the remaining tubes continue to conduct. Pulses representing the second digit are thus repeated from the anode of tube VT54 through tube VK273 of the second digit register 2EDR and stored digit is designated by the conduction of one of the ten tubes VK298 to VK307, tube VK276 being extinguished on the reception of the first pulse of the digit.

The C pulse which occurs at the end of the second exchange digit causes tube VK271 to conduct thereby extinguishing tube VK270 and priming tube VK274. The third exchange digit is thus repeated from the anode of tube VT54 through the tube VK274 to the third digit register 3EDR and is stored by the conduction of one of the ten tubes VK318 to VK327, tube VK277 being extinguished on the reception of the first pulse of the digit.

The above description concerns the case where the required number includes three exchange digits. In a mixed numbering scheme, however, the required subscriber may be located in an exchange having a lesser number of exchange digits and arrangements are provided to cater for these conditions. It is also possible that calls for the local manual board will be set up by dialling the single digit "0." In this case a connection is then made from the cathode of the tube in the first exchange digit register 1EDR corresponding to the digit "0" to terminal T1 associated with the thermionic tube VT47. A 50 volts positive supply is connected to the terminal T1 via a high-valued resistor R56 and rectifier MR5 and to the control grid of the tube via rectifier MR11. If the associated tube in the exchange digit store is non-conducting, the cathode of that tube will be substantially at earth potential and hence the voltage at the junction of resistor R56 and rectifier MR5 will be substantially earth. If, however, the appropriate tube in the exchange digit store is conducting, the cathode thereof will be at approximately 50 volts above earth and consequently current flow through the rectifier MR5 ceases and the potential at the junction of resistor R56 and rectifier MR5 will be approximately 50 volts and the tube VT47 will conduct. The positive cathode voltage is then applied to prime tube VK266 and this tube will be struck on the C pulse after the reception of the first exchange digit. When tube VK266 strikes, it applies a pulse to the pulse delay circuit PD4 and the delayed pulse is delivered to tube VK353. The C pulse obtained at the end of the first exchange digit also causes tube VK270 to strike as previously described but when tube VK353 strikes on the delayed pulse from PD4, tube VK270 will be extinguished. The striking of tube VK353 primes tube VK357 whereby the next digit is stored on the first numerical digit register 1NDR.

It will be understood that there may be other exchanges which may be reached from the exchange shown by the dialling of a single exchange digit. Accordingly the cathode of the appropriate tube in the first exchange digit register will be connected to a second terminal similar to T1 which is associated with a second rectifier/resistor network similar to MR5, MR11 and R56, the positive side of the rectifier corresponding to MR11, being also connected to the control grid of tube VT47 as indicated by the commoning mark. It will be understood that the rectifiers such as MR11 serve to separate the various circuits.

Again other exchanges may be reached by dialling two exchange digits and this condition is catered for by the provision of tube VT48. In a particular case, the cathodes of the appropriate tubes in the first and second digit stores are connected to terminals T2 and T3 respectively, while the negative sides of the rectifiers MR6 and MR7 are commoned and connected to the junction of resistor R59 and rectifier MR12. In this case, conduction of tube VT48 only occurs when the cathodes of the tubes in the two exchange digit stores are conducting and it is only then that the priming potential applied to tube VK267 is sufficient to cause the tube to be struck on the reception of the C pulse following the second exchange digit. Where there is more than one exchange reached by dialling two exchange digits, other resistor/rectifier networks will be connected to the control grid of tube VT48.

Finally in cases where three exchange digits are required, the cathodes of the appropriate tubes in the first, second and third stores will be connected, for a particular combination of three exchange digits to terminals T4, T5 and T6 and thence via three rectifiers such as MR8, MR9 and MR10 to the control grid of tube VT49, the negative side of the rectifiers being commoned and connected to the junction of MR12 and resistor R64. Tube VT49 will therefore conduct sufficiently to prime tube VK268 only when the appropriate tube in each digit register is conducting. The cathodes of other combinations of tubes in each digit store are also connected to the control grid circuit of VT49 through other rectifier-resistor networks. It will be appreciated that if the maximum number of exchange digits is three, the tube VT49 will be unnecessary and tube VK353 will be struck by a suitable circuit from the third exchange digit register.

Arrangements are also provided for taking care of the case where the subscriber dials an unallocated combination of exchange digits. Tube VT40 is provided for this purpose and is controlled from the appropriate cathodes of the first, second and third exchange digit registers in a similar manner to tube VT49. When tube VT40 conducts it primes tube VK223 and this tube is struck by the C pulse following the third exchange digit. Tube VK223 in striking applies a pulse to the pulse repeater tube VK226 which strikes and applies a negative-going pulse to tube VT42. This tube is thus cut off and the positive-going pulse in the anode circuit causes tube VK221 to strike, the cathode resistor of this tube being resistor R49 connected to lead 162 in the trunk connecting circuit (Fig. 11). The positive voltage at resistor R49 causes tube VK213 to strike, the tube being primed from tube VK212 as previously described. Tube VK213 in striking applies a positive bias to the tone generating network to cause number unobtainable tone to be transmitted to the calling party.

Where the three exchange digits are required, tube VK268 will strike on the C pulse following the reception of the third digit and will deliver a pulse to the pulse delay circuit PD4. The delayed pulse will cause tube VK353 to strike and this tube applies a priming potential to the tube VK357. The fourth digit i.e. the first numerical digit, is thus repeated by tube VK357 to the first numerical digit register 1NDR and is stored by the conduction of one of the ten tubes VK366 to VK375. The remaining three numerical digits are stored in the registers 2NDR to 4NDR comprising the tubes VK376 to VK385, VK386 to VK395 and VK396 to VK405 respectively, the pulses being repeated through tubes VK358 to VK360 respectively.

It will be understood that the number of numerical digits required to set up a connection to a subscriber in another exchange may vary, particularly in a mixed numbering scheme and arrangements are provided for indicating the number of numerical digits required. This number will be determined when the exchange digits have been stored on the exchange digit registers and connections are taken from the cathodes of the appropriate tubes in the exchange digit registers through rectifiers to the control grids of the four tubes VT50 to VT53. These tubes are controlled in a similar manner to tubes VT47 to VT49. If tube VT50 conducts indicating that one numerical digit only is required, tube VK345 is primed so that when tube VK349 strikes to the C pulse at the end of the first numerical digit, tube VK345 strikes and the positive voltage on R61 is fed over lead 196 to the common connecting circuit of the group selector common control circuit (Figs. 18 to 21) which serves the register. Alternatively if two, three or four numerical digits are required either tube VT51, VT52 or VT53 will conduct to primme the corresponding tubes VK246 to VK348. When tubes VK350 to VK352 strike in turn in response to successive C pulses, the appropriate one of tubes VK346 to VK348 will fire and the positive voltage on R61 will cause a positive potential to be applied over lead 196 to the common connecting circuit. It will be noted that in the drawing the tubes VT50 to VT53 are shown as controlled by connections from two exchange digit registers. This, however, is given merely by way of example and it will be understood that the control may be from one or three exchange digit registers according to the particular circumstances.

The group selector common control circuit which is shown in Figs. 18 to 21 serves 100 registers and is connected to any one of the registers when all the dialled digits have been stored therein, under the control of a common connecting circuit CCC. The connecting circuit operates to scan the registers in succession in a similar manner to the scanning of the line circuits by the line finder/final selector common control, the operation of the connecting circuit being terminated when it arrives at a register in which all the dialled digits have been stored. The connecting circuit is driven by two counters 2EC1 and 2EC2 comprising ten tubes VK720 to VK729 and VK740 to VK749 respectively and a pulse distributor CPD comprising the ten tubes VK730 to VK739. A pulse generator PG3 delivers negative-going pulses to the control grid of the thermionic tube VT72, which is normally conducting. The negative-going pulses from the pulse generator PG3 are of sufficient amplitude to cut off the tube and the positive-going anode pulses are applied to the trigger electrodes of thte tubes of the counter 2EC1 and the pulse distributor CPD. Further each time the tube VK739 in the distributor CPD strikes it applies a pulse to the counter ES2. The connecting circuit consists of 100 tubes such as VK679 each of which is individual to a register and the cathode voltage of each tube of the counter 2EC2 is applied simultaneously to the trigger electrodes of ten of these tubes during the time that the cathode voltage of the tubes of the distributor CPD is applied successively to these ten tubes and similarly for the other groups of ten tubes. The tubes such as VK679 are thus caused to strike in turn and when one of them strikes, a positive pulse is applied to the trigger electrode of an associated tube VK678. If the register corresponding to this tube has no need of the group selector common control, there will be no priming potential on this tube and it does not, therefore, strike. If, however, the corresponding register has stored in it the dialled digits of a required number, the tube will be primed from the positive voltage on R61 in the register. The tube consequently strikes and the positive cathode voltage on R83 serves to strike the tube VN158. The consequent positive voltage on R79 is then applied to the control grid of tube VT72 so that the negative-going pulses from the pulse generator PG3 are no longer effective and the scanning operation is terminated. The positive voltage on R83 also causes a positive potential to be applied over lead 195 to the register where it primes tubes VK341, VK342 to VK344 and VK410 to VK413, and also VK225.

The positive voltage on R79 also causes a pulse to be applied to the time throw out circuit TTO3 and also to the control grid of the normally non-conducting tube VT60. This tube thus conducts for the duration of the pulse and serves to cut off the normally conducting tube VT61 also for the duration of the pulse. The consequent positive potential in the anode circuit of tube VT61 is accordingly applied to lead 170 and serves to strike the tube VK341 in the register to which a priming potential is applied over lead 195. This tube, which is arranged as a pulse repeater, repeats the negative-going pulse in its anode circuit to the normally conducting tube VT41 which is thus cut off. The resulting positive anode potential serves to strike tube VK222 in the register connector which was primed from resistor R62 as previously explained. The anode supply voltage for this tube and other tubes in the register is obtained over lead 197 from the group selector common control circuit for a purpose which will be explained later. The cathode is connected over lead 160 to the cathode resistor R48 in the trunk connecting circuit. The positive voltage on R48 is extended over lead 152 to the group selector (Fig. 23) where it primes the tubes such as tube VK803 in all the sets of tubes of the group selector primary switch to which the trunk connecting circuit shown in Figs. 10 and 11 is connected. In the group selector link circuits, of which one is shown in Fig. 23 a tube such as tube VT80 in each link circuit, is non-conducting if the link is idle thereby enabling a priming potential to be applied to the trigger electrode of a tube such as tube VK804. The positive potential on lead 152 also causes a tube such as VN161 in all the link circuits connected to the selected trunk connecting circuit to strike and the consequent positive voltage on R90 is applied as a pulse to the tubes such as tube VK804 in such link circuits. In those link circuits which are idle, the tubes such as VK804 will strike and the positive cathode voltage of these tubes serves to prime the tubes such as tube VK809 of the sets of tubes in the group selector secondary switches to which the links are connected.

Each group selector secondary switch is connected to twenty incoming trunk connecting circuits and it is now necessary to select an idle one of the incoming trunk connecting circuits to which the selected outgoing trunk connecting circuit has access. This is effected by a plurality of sets of twenty tubes in the group selector common control circuit. Of these tubes only the first VK750 and the last VK769 of the first set are shown for convenience, but it will be understood that there are as many sets as there are group selector secondary switches.

Referring now to the incoming trunk connecting circuit which is shown in Fig. 24, tube VT91 is cut off when the connecting circuit is idle so that tube VK821 is conducting. A positive voltage is thus developed on resistor R100 and this causes positive potential to be applied over lead 202 to prime tube VK750 of the previously mentioned first set of twenty tubes in the group selector common control. Similarly positive potential is applied from all the idle incoming trunk connecting circuits to which the selected outgoing trunk connecting circuit has access, over leads similar to lead 202 to prime other tubes similar to tube VK750 in the first group of twenty tubes. When tube VK804 in the group selector link circuit strikes, the positive voltage on resistor R91 causes tube VN163 to strike. Lead 200 connected to tube VN163 extends together with other similar leads from the other levels of the group selector secondary switch to resistor R71 in the group selector common control circuit and consequently a pulse is applied to all the twenty tubes VK750 to VK769. Those of the tubes which represent idle incoming trunk relay sets will strike, and a positive voltage will be developed on the cathode resistors which are each located in the corresponding incoming trunk connecting circuit. Thus, for instance, when tube VK750 strikes, the positive voltage on resistor R102 (Fig. 24) which is connected to the cathode over lead 203 causes a positive potential to be applied over lead 123 to the common control circuit such as shown in Figs. 4, 5 and 6, of the line finder/final selector over which the incoming trunk connecting circuit shown in Fig. 24 is accessible. It will be understood that positive potential will also be applied over leads such as 123 to other line finder/final selector common control circuits, the determination as to which common control will be taken into use being effected by which line finder/final selector gives access to the required line as will be described in detail subsequently.

Hence in response to the reception of the digits of the called party's number in the register, the following operations take place:

(1) The group selector common control is associated with the register, (2) The outgoing trunk connecting circuit to which the call has been extended takes into use the group selector primary switch to which it is connected, (3) The seized group selector primary switch takes into use all the free links extending therefrom to the group selector secondary switches and subsequently the associated incoming trunk connecting circuits, (4) The incoming trunk connecting circuits extend markings to the common controls serving the line finder/final selectors to which they have access.

Consideration will now be given to the transfer of the digits representing the called party's number from the register to the group selector common control equipment. When the common connecting circuit CCC finds a register as previously described and tube VN158 strikes, the positive voltage on resistor R79 is applied to the pulse delay circuit PD5, the delayed and inverted pulse from which serves to cut off the thermionic tubes VT63, VT64 and VT65. Referring particularly to tube VT63, when this tube is cut off, positive potential is applied to both leads 172 and 173 thereby causing the striking of tube VK342 in the register (Fig. 14). The cathod resistor of tube VK342 is R60 which is common to the cathode circuits of the ten tubes VK278 to VK287 of the first exchange digit register 1EDR. It will be understood that the effect of the striking of tube VK342 will be to increase the cathode voltage of that one of the tubes VK278 to VK287 which is already conducting, thereby causing the diode connected to the cathode to strike. The ten diodes of which VN52 and VN61 only are shown are connected over the cable 174 to the first exchange digit store 1EDS in the group selector common control, the store comprising ten tubes VK510 to VK519 of which only the first and last are shown. Assume, for example, that tube VK278 in the first digit regiser 1EDR is conducting, indicating a first exchange digit of 1. Then when tube VK342 strikes, the increase in the cathode voltage of tube VK278 causes the associated diode VN52 to strike and the resulting positive voltage on resistor R70 in the group selector common control causes the striking of the first tube VK510 of the first exchange digit store 1EDS. The first exchange digit has thus been transferred from the register to the group selector common control.

Similarly the cutting off of tubes VT64 and VT65 causes the striking of one of the diodes VN62 to VN71 and VN72 to VN81 respectively whereby the second and third exchange digits are transferred to the second and third exchange digit stores 2EDS and 3EDS in the group selector common control, the second exchange digit store 2EDS consisting of the tubes VK520 to VK529 while the third exchange digit store 3EDS consists of the tubes VK530 to VK539.

When the first exchange digit has transferred to the first exchange digit store, for instance by causing the tube VK510 to strike, a priming potential is applied to tube VK500 of ten tubes each of which corresponds to a tube in the store. At the same time, tube VN130 associated with tube VK510 strikes and applies a positive potential to the pulse delay circuit PD6. The delayed pulse from PD6 is applied through an invertor INV1 and tube VT62 to the trigger electrodes of the ten tubes VK500 to VK509 but only the tube VK500 strikes since it is the only one which has been primed from the first exchange digit store.

Before proceeding with the operation of the group selector common control subsequent to the transfer thereto of the three exchange digits, consideration will be given to the coding field which is employed for translation purposes. The coding field consists of a number of tubes which are controlled from the three exchange digit stores in such a way that each three digit exchange code is represented by the striking of a single tube. Thus the ten leads from the cathodes of tubes VK500 to VK509, each of which represents one value of the first exchange digit, are each connected via capacitors such as C20 to the trigger electrodes of ten tubes such as tube VK540. There are thus ten groups of tubes, each group including ten tubes and each group of ten tubes represents a different value of the first exchange digit. Further the ten leads from the cathodes of tubes VK520 to VK529 forming the second exchange digit store 2EDS are each connected to trigger electrodes of ten of the 100 tubes which represent different values of the first exchange digit. Thus a particular tube will strike for a particular combination of the first and second exchange digits and this tube will be different from those which strike for other combinations of the first and second exchange digits. The cathode of each of the 100 tubes is connected via capacitors such as C21 to the trigger electrodes of ten further tubes such as VK541 giving 1000 tubes in 100 groups of ten tubes. Finally the ten leads from the cathodes of tube VK530 to VK539 forming the third digit store 3EDS are each connected to the trigger electrodes of 100 of the 1000 tubes representing the 100 combinations of the first and second exchange digits. In the drawing the tubes are shown for one particular combination of the three exchange digits but it will be understood that if every combination of three digits is used, a total of 1100 tubes will be required. However, in practice a lesser number will be required, this number depending in part on the number of exchanges accessible to the exchange at which the coding field is located.

It will also be understood that where one or two exchange digits are used, separate sets of tubes could be used to cater for these cases. Thus for a single exchange digit, one tube would be struck direct from one of the tubes VK500 to VK509 while for two exchange digits, one tube would be struck from one of the tubes VK500 to VK509 and from the second exchange digit store.

Considering the two tubes shown in the drawing, tube VK540 is caused to strike from the first and second digit store. Tube VK541 is primed from the third digit store and is pulsed from the cathode of tube VK540. Tube VK541 is thus the tube which represents the three exchange code digits. The next operation is to determine the routing digits which are to be transmitted in response to this particular combination of exchange digits and in this connection it should be explained that in the circuit shown provision is made for three routing digits but it will be understood that this is by way of example only, and it will be obvious that this number may be increased or decreased as desired according to the location of the desired exchange. For the purpose of determining the routing digits, the cathode of tube VK541 is connected through three isolating diodes VN140, VN141 and VN142 to the appropriate one of the tubes of three routing digit transfer circuits 1RDTC, 2RDTC and 3RDTC according to the translation of digits required to route the call to the wanted exchange. For instance, when the diode VN140 strikes, the positive voltage on R72 causes the first tube VK542 of the first routing digit transfer circuit to strike, this circuit comprising tubes VK542 to VK551. Similarly one of the tubes in the second digit transfer circuit, comprising tubes VK552 to VK561 strikes and one of the tubes in the third digit transfer circuit, comprising tubes VK562 to VK571, also strikes.

It will be noted that the cathodes of the ten tubes in the first routing digit transfer circuit are connected via cable 171 to the trigger electrodes of the corresponding ten tubes such as VK288 to VK297 in all the registers. Thus assuming as before that tube VK542 of the first routing digit transfer circuit has been struck, the positive cathode voltage will be applied to the trigger electrode of the tubes corresponding to tube VK288 in all the registers. However, only tube VK288 in the register shown will strike since it is the only one which is primed from the common connecting circuit of the group selector common control. The first routing digit is thus transferred to the register. Similarly the cathodes of the tubes in the second routing digit transfer circuit 2RDTC are connected via cable 175 to the trigger electrodes of tubes such as tubes VK308 to VK317 in all the registers but again only the appropriate one of tubes VK308 to VK317 will strike to register the second routing digit. Finally the cathodes of the tubes in the third routing digit transfer circuit 3RDTC are connected via cable 179 to the trigger electrodes of tubes such as tubes VK328 to VK337 in all the registers but again only the appropriate one of tube VK328 to VK337 will strike to register the third routing digit.

It will, however, be understood that routing digits are only necessary on a call which is outgoing to another exchange. Therefore since the present invention is not concerned with the equipment for setting up such calls, no further description will be given of the manner in which the routing digits may be employed.

In the case of a local call, tube VK572 in the coding field strikes and the positive cathode voltage is applied to the inverter INV3 from which a negative pulse is applied to the control grid of the normally conducting tube VT68 which is thereupon cut off. Positive potential is thus applied to leads 189 and 190 extending to all registers thereby causing tube VK412 to strike in the called register. As described for the exchange digits, this causes an increase in the cathode potential of the conducting tube in the third numerical digit register whereby the associated one of the diodes VN102 to VN111 strikes.

However, before describing the transfer of the numerical digits in detail, consideration will be given to the arrangements necessary for marking the required line from the group selector common control. As previously explained the lines in a 10,000 line exchange are divided into 20 groups of 500 lines each and the groups are each divided into 20 sub-groups of 25 lines each. It is, therefore, necessary and sufficient to provide three markings for the selection of any particular one of the 10,000 lines, the first marking selecting the 500 line group, the second selecting the 25 line sub-group and the third selecting the desired one of the 25 lines. Four numerical digits have, however, been stored in the register and to obtain the three markings from these four digits a translation has to be effected. This translation is effected partly in translation circuits for the 2nd and 3rd digits and partly in the three marker circuits. The translation can be effected in a number of ways and that about to be described is one only of these ways but one which has been found to be satisfactory in practice.

Considering the directory numbers in a 10,000 line exchange, a 500 line group may be divided into groups of 25 in the following manner: 1111–1135; 1136–1160; 1161–1185; 1186–1100 and so on to 1586–1500 for the 20th sub-group. The twenty sub-groups form a group of 500 numbers, 1111–1500 and the other groups will be numbered 1611–1000; 2111–2500; 2611–2000 and so on to the 20th group 0611–0000. Now a consideration of these numbers will show that a group of 500 lines is completely defined by the first two digits. Further since there are 5 combinations of the first two digits in each group e.g., 11– –, 12– –, 13– –, 14– – and 15– – for the first group, a single marking representing these five combinations must be obtained from these particular combinations in order to determine the group. In order to simplify the following explanation, the markings will be referred to by using letters and it will be assumed that marking $a$ is extended in response to the two digit combinations 11, 12, 13, 14 and 15; marking $b$ in response to the combinations 16, 17, 18, 19 and 20 and so on to marking $u$ in response to the combinations 06, 07, 08, 09 and 00 (letter $i$ being omitted).

The selection of the required line in the group is effected by combining the second and third markings. The second marking is dependent on the 2nd and 3rd digits while the third marking is dependent on the 3rd and 4th digits. In the particular arrangement adopted, the second marking reference $a$ represents the combinations –11–, –16–, –61–, and –66–; reference $b$ represents –12–, –17–, –62–, –67– and so on to reference $e$ representing –15–, –10–, –68– and –60–; reference $f$ represents –21–, –26–, –71– and –76– and this continues to reference $z$ which represents –55–, –50–, –05– and –00–. The third marking reference $a$ represents – –11, – –21, – –31, – –41 and – –51; reference $b$ represents – –61, – –71, – –81, – –91 and – –01; reference $c$ represents – –12, – –22, – –32, – –42 and – –52; reference $d$ represents – –62, – –72, – –82, – –92 and – –02 and so on to reference $u$ which represents – –60, – –70, – –80, – –90 and – –00. It will thus be seen that the three markings $a$ $a$ $a$ represents the number 1111; $a$ $a$ $c$ represents 1112; $a$ $a$ $e$ represents 1113 and so on, all the numbers in the 10,000 being represented by one combination only of the three markings.

A description will now be given of the circuit arrangements whereby these markings are obtained and it should be explained that the particular system of marking described above was selected in view of the comparatively simple circuit arrangements required to provide the markings., As previously mentioned the 3rd numerical digit is first transferred to the corresponding translation circuit 3NDTC in the group selector common control. This translation circuit consists of ten pairs of tubes VK648 and VK649 to VK666 and VK667 of which the first VK648 and VK649, the fifth VK656 and VK657, the sixth VK658 and VK659 and the tenth VK666 and VK667 are shown. Each pair of tubes is pulsed over one of the ten leads extending from the third numerical digit store 3NDS in the register, the ten leads being represented by the cable 191. The tubes VK648 and VK658 i.e. the first tubes of the 1st and 6th pairs, have a common cathode resistor R75 and so have the first tubes of the 2nd and 7th pairs, the 3rd and 8th pairs and so on, the common cathode resistor for the first tubes VK656 and VK666 of the 5th and 10th pairs being R76. The second tubes of the 1st, 2nd, 3rd and 4th and 5th pairs have a common cathode resistor R77 while the second tubes of the 6th to 10th pairs have a common cathode resistor R78. Of the five cathode resistors of the first tubes, a voltage will be developed on the first, R75, for digits 1 and 6, the second (not shown) for digits 2 and 7 and so on while of the two cathode resistors R77 and R78 of the second tubes, a voltage will be developed on the first for digits 1 to 5 and on the second for digits 6 to 0. The translation circuit 2NDTC for the second numerical digit is arranged in a similar way to that for the third numerical digit while the translation circuits 1NDTC and 4NDTC for the first and fourth numerical digits are entirely straightforward.

The cathode voltages from the four translation circuits are effective on three marker circuits MAR1, MAR2 and MAR3. The first marker circuit MAR1 is a 20-way marker comprising the tubes VK573 to VK592. The cathodes of tubes VK618 to VK627 forming the first numerical digit translating circuit 1NDTC are connected to the trigger electrodes of the tubes VK573 to VK592 of the marker MAR1 as indicated by the cable 230, the arrangement being such that the cathode of tube VK618 is connected to the trigger electrode of the 1st and 11th tubes in the marker circuit i.e. to tubes VK573 and VK583 (not shown). The cathode of the second tube VK619 (not shown) of the translation circuit will be connected to the trigger electrodes of the 2nd and 12th tubes and so on, the cathode of tubes VK627 in the translation circuit being connected to the trigger electrodes of the 10th and 20th tubes VK582 (not shown) and VK592. The cathode voltages of the tubes in the translation circuit provide a priming potential for the tubes of the marker MAR1. The tubes of the first marker circuit are struck from the anodes of the two thermionic tubes VT70 and VT71 while the tubes VT70 and VT71 are themselves controlled from the two cathode resistors R73 and R74 of the second tubes of each pair of the second numerical digit translation circuit 2NDTC. The arrangement is such that the voltage on the common cathode resistor R73 of tubes VK629, VK631, VK633, VK635 and VK637 serves to cause tube VK70 to conduct while the voltage on the common cathode resistor R74 serves to cause tube VT71 to conduct. A voice frequency voltage is applied to the control grids of the two tubes from a source connected to leads VF3 and VF4 so that when tube VT70 conducts, pulses having a repetition frequency within the voice frequency range are applied to the trigger electrodes of tubes VK573 to VK582 in the marker MAR1 while when tube VT71 conducts, similar pulses are applied to the trigger electrodes of tubes VK583 to VK592 of the marker. The reason for applying a series of pulses to the trigger electrodes will be explained later. It will thus be seen that the combinations of the first and second numerical digits which cause the striking of the tubes in the marker MAR1 are as set out in the following table:

secutive tubes. Thus the voltage on the common cathode resistor of tubes VK628 and VK638 is applied as a pulse to the trigger electrodes of the 1st, 6th, 11th, 16th and 21st tube in the marker circuit. With this arrangement the combinations of the second and third digits which cause the striking of the various tubes in the marker circuit MAR2 will be as shown in the following table:

| Tube No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Combinations of 2nd and 3rd Digits. | 11<br>16<br>61<br>66 | 12<br>17<br>62<br>67 | 13<br>18<br>63<br>68 | 14<br>19<br>64<br>69 | 15<br>10<br>65<br>60 | 21<br>26<br>71<br>76 | 22<br>27<br>72<br>77 | 23<br>28<br>73<br>78 | 24<br>29<br>74<br>79 | 25<br>20<br>75<br>70 | 31<br>36<br>81<br>86 | 32<br>37<br>82<br>87 | 33<br>38<br>83<br>88 | 34<br>39<br>84<br>89 | 35<br>30<br>85<br>80 | 41<br>46<br>91<br>96 | 42<br>47<br>92<br>97 | 43<br>48<br>93<br>98 | 44<br>49<br>94<br>99 | 45<br>40<br>95<br>90 | 51<br>56<br>01<br>06 | 52<br>57<br>02<br>07 | 53<br>58<br>03<br>08 | 54<br>59<br>04<br>09 | 55<br>50<br>05<br>00 |

The marker circuit MAR2 thus provides the second marking previously mentioned.

The third marker circuit MAR3 is a 20-way marker comprising the tubes VK680 to VK699. The cathode voltages in the common cathode resistors of the second tubes of the third numerical digit translation circuit 3NDTC taken in groups of five are applied as priming potentials to the tubes VK680 to VK699 as indicated by the cable 232, the arrangement being such that the voltage on the common cathode resistor R77 of tubes VK649, VK651, VK653, VK655 and VK657 is applied as a bias to the 1st, 3rd, 5th and so on tubes of the marker circuit while the voltage on the common cathode resistor R78 of tubes VK659, VK661, VK663, VK665 and VK667 is applied as a bias to the 2nd, 4th, 6th and so on tubes of the marker circuit. The tubes are pulsed from the cathodes of the 4th numerical digit translation circuit 4NDTC comprising tubes VK668 to VK677 as indicated by the cable 234, the arrangement being such that one tube in the translation circuit controls the pulsing of two consecutive tubes in the marker circuit. The combinations of the third and fourth digits which cause the strik-

| Tube No. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Combination of 1st and 2nd Digits. | 11<br>12<br>13<br>14<br>15 | 21<br>22<br>23<br>24<br>25 | 31<br>32<br>33<br>34<br>35 | 41<br>42<br>43<br>44<br>45 | 51<br>52<br>53<br>54<br>55 | 61<br>62<br>63<br>64<br>65 | 71<br>72<br>73<br>74<br>75 | 81<br>82<br>83<br>84<br>85 | 91<br>92<br>93<br>94<br>95 | 01<br>02<br>03<br>04<br>05 | 16<br>17<br>18<br>19<br>10 | 26<br>27<br>28<br>29<br>20 | 36<br>37<br>38<br>39<br>30 | 46<br>47<br>48<br>49<br>40 | 56<br>57<br>58<br>59<br>50 | 66<br>67<br>68<br>69<br>60 | 76<br>77<br>78<br>79<br>70 | 86<br>87<br>88<br>89<br>80 | 96<br>97<br>98<br>99<br>90 | 06<br>07<br>08<br>09<br>00 |

The marker circuit MAR1 thus provides the first marking previously mentioned.

ing of the tubes in the marker circuit MAR3 are as shown in the following table:

| Tube No. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Combinations of 3d and 4th Digits. | 11<br>21<br>31<br>41<br>51 | 61<br>71<br>81<br>91<br>01 | 12<br>22<br>32<br>42<br>52 | 62<br>72<br>82<br>92<br>02 | 13<br>23<br>33<br>43<br>53 | 63<br>73<br>83<br>93<br>03 | 14<br>24<br>34<br>44<br>54 | 64<br>74<br>84<br>94<br>04 | 15<br>25<br>35<br>45<br>55 | 65<br>75<br>85<br>95<br>05 | 16<br>26<br>36<br>46<br>56 | 66<br>76<br>86<br>96<br>06 | 17<br>27<br>37<br>47<br>57 | 67<br>77<br>87<br>97<br>07 | 18<br>28<br>38<br>48<br>58 | 68<br>78<br>88<br>98<br>08 | 19<br>29<br>39<br>49<br>59 | 69<br>79<br>89<br>99<br>09 | 10<br>20<br>30<br>40<br>50 | 60<br>70<br>80<br>90<br>00 |

The marker circuit MAR2 is a 25-way marker comprising the tubes VK593 to VK617. The cathodes of the first tube of each pair in the third numerical digit translation circuit are connected to the trigger electrodes of the tubes VK593 to VK617 of the marker MAR2 as indicated by the cable 231, the arrangement being such that the cathode voltage on the common cathode resistor of the first tubes taken in pairs is applied as a priming potential to five consecutive tubes in the marker circuit. Thus the cathode voltage on R75 of the tubes VK648 and VK658 of the translation circuit is applied as a bias to the tubes VK593 to VK597 in the marker circuit, tube VK593 only being shown. Pulses are applied to the tubes in the marker circuit MAR2 from the cathodes of the first tubes of each of the first five pairs in the second numerical digit translation circuit 2NDTC in a similar way as indicated by cable 233, that is the voltage on the common cathode resistor of two of the first tubes of the pairs is caused to pulse five tubes in the marker circuit but in this case they are not con- The marker circuit MAR3 thus provides the third marking previously mentioned.

It will thus be seen that the markings extended from the three marking circuits MAR1, MAR2 and MAR3 are sufficient to mark any particular line in the 10,000 lines in the exchange with the particular line grouping described and in response to four numerical digits. The striking of a tube in the marking circuit MAR1 causes a positive voltage to be developed on the cathode resistor such as R11 connected to lead 117 in the LF/FS common control for the tube VK573 and this positive voltage causes a potential to be applied via a metal rectifier such as MR15 to a lead such as 117 extending to the line finder/final selector common control which serves the required 500 line group. The cathodes of the tubes VK680 to VK699 in the third marker circuit MAR3 are connected by cable 236 to all the line finder/final selector common control circuits in order to select the sub-group of 25 lines which includes the required line and the cathodes of the tubes VK593 to VK617 in the second marker circuit MAR2 are similarly connected by cable 235 to all the line finder/final selector common control circuits in order to select the required line in the selected sub-group.

Returning now to the operation of the circuit, it has already been explained that the third numerical digit is the first of the numerical digits to be transferred from the register to the group selector common control. It will be noted that a diode VN143 is connected in common to the cathodes of the second tubes VK649, VK651, VK653, VK655 and VK657 of the third numerical digit translation circuit 3NDTC and a second diode VN147 is connected in common to the remaining five of the second tubes, VK659 and VK667 only being shown. A common cathode resistor R81 is provided for the two diodes and consequently when any digit is transferred to the third numerical digit translation circuit, a positive voltage is developed on this resistor. This positive voltage is applied to the delay inverter circuit INV4, the output from which serves to cut off the tube VT69. This tube is connected to the register over leads 192, 193 in a similar manner to tube VT68 and the cutting off of the tube causes the fourth numerical digit to be transferred from the corresponding store in the register to the corresponding translation circuit 4NDTC in the group selector common control. Diodes VN148 to VN157 are connected to each of the tubes VK668 to VK677 in the fourth numerical digit translation circuit, a common cathode resistor R82 being provided for all the ten tubes. Accordingly when any tube in the fourth numerical digit translation circuit strikes, the positive voltage on resistor R82 is applied via the inverter INV2 to cut off the tubes VT66 and VT67. These two tubes are connected to the register over leads 183, 184 and 186, 187 respectively in a similar manner to tubes VT68 and VT69 so that when tubes VT66 and VT67 are cut off, the first and second numerical digits are transferred from the corresponding stores in the register to the corresponding translation circuits in the group selector common control.

The transfer of the four numerical digits to the four translation circuits in the group selector common control causes the striking of a tube in each of the marker circuits MAR2 and MAR3. The striking of the appropriate one of the primed tubes in the marker circuit MAR1 however, depends upon the availability of the line finder/final selector common control which corresponds to the particular tube in the marker which has to be struck. Assume, for instance, that tube VK573 in the marker circuit MAR1 is being pulsed and this tube corresponds to the line finder/final selector common control shown in Figs. 4 to 6. If this common control is busy on an outgoing call, a positive potential will be applied to lead 117 due to the striking of tube VK70. Lead 117 is connected to rectifier MR15 (Fig. 21) of the group selector common control and the positive potential thereon will serve to back off the tube VK573 so that this tube does not strike when it is pulsed. However, the tube VK573 is repeatedly pulsed through tube VT70 from the voice frequency source connected to lead VF3, and this continues until the line finder/final selector common control becomes available which will normally occur in a few millisecs. When this occurs the tube VK573 strikes and the positive voltage on the cathode resistor R11 causes a pulse to be applied to tube VK700, which strikes. The cathode of tube VK700 is connected over lead 118 to resistor R15 in the line finder/final selector common control. When tube VK700 strikes therefore, the positive voltage on R15 serves to strike tube VN10 thereby terminating the scanning of the subscribers' lines as previously described. The positive voltage on resistor R10 due to the striking of tube VN10 also causes tubes VK70 and VK71 to strike as previously described. Further the positive voltage on R15 serves to strike tube VK122 and a pulse is applied to the reset circuit RS1 from the common cathode resistor R13. Finally the positive voltage on R15 in the line finder/final selector common control is also applied over lead 113 extending to all the link circuits of the line finder/final selectors served by the seized common control. This positive potential serves to prime tubes such as tubes VK172 and VK185 in such link circuits.

It should be explained that in order to avoid the possibility of dual switching to a line finder/final selector common control by a calling line and a calling group selector common control, the potentials applied over leads VF3 and VF4 (Fig. 21), are arranged to be in antiphase with the pulse generator PG1 (Fig. 4).

The marking potential on one of the marking leads extending from marker MAR2 in the group selector common control is applied to the trigger electrode of the corresponding one of the 25 tubes VK900 to VK924 in the selected line finder/final selector common control. Also the marking potential on one of the marking leads extending from marker MAR3 in the group selector common control is applied to the trigger electrode of the corresponding one of the 20 tubes VK30 to VK49 in all the line finder/final selector common controls over the cable 236. Further, the positive voltage on R15 will cause VN13 to strike and the consequent positive voltage on R14 will firstly apply a priming potential to thermionic tube VT13 and secondly cause a pulse to be applied to the pulse delay circuit PD1. The positive voltage on resistor R15 will also strike VK122 which in turn applies a positive pulse to the reset circuit RS1. At the end of the operation of this circuit, tube VT13 which has been primed from resistor R14 conducts and cuts off thermionic tube VT12 thereby applying a pulse to the trigger electrodes of all of the tubes VK900 to VK924. Only one of these tubes will strike, namely that one which has been primed from the group selector common control. Assume, for example, that tube VK900 strikes. The positive cathode voltage causes a positive potential to be applied over lead 105 to the appropriate line circuit. Assuming that one of the line circuits so marked is the one shown in Fig. 3, the positive potential causes VN2 to strike and the consequent positive voltage on resistor R1 will be applied via C2 to the trigger electrode of tube VK3. Meanwhile the pulse from the pulse delay circuit PD1 in the line finder/final selector common control which has a shorter delay than the reset circuit RS1 is applied to the trigger electrodes of the 25 tubes VK30 to VK49. Only one of these strikes, however, namely that one which has been primed over lead 119 from the group selector common control. Assuming this tube to be the tube VK30, a positive potential will, therefore, be applied over lead 106 to prime tube VK3 in the line circuit. Tube VK3 therefore strikes when it is pulsed from tube VK2 with similar results to those described in connection with the originating call.

In particular, all the idle primary and secondary final selectors to which the called line has access are temporarily taken into use, together with their associated link circuits, tubes such as tube VK126 in the line finder/final selector common control representing such idle primary and secondary final selectors, striking as previously described. There is now a difference in the setting up of the incoming end of the connection compared with the setting up of the outgoing end of the connection. In the latter case, the determination as to which primary and secondary switch was taken into use was governed solely by the consideration whether one of the outgoing trunk connecting circuits associated with the switches was available. In the case of an incoming call, however, one of the primary and secondary switches is selected which is associated with the incoming trunk connecting circuits which have been temporarily taken into use. It has been described previously how when an incoming trunk connecting circuit is taken into use, a positive potential is applied to lead 123 which is individual to that connecting circuit. Now each line finder/final selector is associated with five incoming connecting circuits and the individual leads from these five connecting circuits are connected to the trigger electrodes of five tubes VK144 to VK148 in the line finder/final selector common control. It will be understood that since each common control serves ten secondary switches, there will be ten sets of five tubes such as VK144 to VK148 in the common control. However, in order to simplify the drawing only one set of five has been shown and it has been assumed that lead 123 of the incoming connecting circuit taken into use is connected to the trigger electrode of tube VK148. This tube, and possibly others, is therefore primed when the associated connecting circuits are taken into use. Further when the positive voltage appears on resistor R15 as previously described, tube VK127 of the discriminating circuit is backed off while tube VK128 is primed. This tube is struck when VN12 strikes following the striking of tube VK126 as previously described. When tube VK128 strikes the positive voltage on resistor R23 is applied as a pulse to all the tubes VK144 to VK148 with the result that those tubes, including tube VK148, strike which have been primed from the incoming connecting circuits. Tubes VK144 to VK148 are arranged in a similar manner to tubes VK129 to VK133 and form part of a series of test circuits the operation of the first circuit being effected by the positive voltage developed on the common resistor R22 when one of the tubes VN20 to VN24 strikes. This causes the pulse delay circuit PD3 to apply a pulse to the tubes VK149 and VK154. Assuming that tube VK148 is the only one primed, the delayed pulse strikes tube VK149 since tube VK144 is not conducting but tube VK154 will not strike. Tube VK149 in striking passes on the pulse to the next pair of tubes and the operation continues automatically until the fifth stage is reached. Here tube VK148 is conducting and hence tube VK153 is backed off and tube VK158 is primed. The latter tube is therefore struck by the applied pulse, the cathode resistor being R103 in the incoming trunk connecting circuit. The positive voltage on resistor R103 serves to strike tubes such as VK195 in the secondary multiple for incoming trunks SMIT (Fig. 9), this tube having been primed over lead 115 from the line finder/final selector common control on the striking of tube VK126. The striking of tube VK158 therefore takes into use one of the available incoming trunk connecting circuits and also primes the VK195 tube of the set in the outgoing multiple of the link circuit which connects the called line circuit with the selected incoming trunk connecting circuit.

Tube VK195 in striking causes the striking of tubes VK192 and VK193 and primes tube VK194. A further tube VN33 strikes to resistor R33 and causes tube VT20 to conduct thus applying a negative potential to lead 114 to mark the link circuit as busy in the manner previously described. The positive voltage on resistor R33 also causes tube VK185 to strike, this tube having been primed over lead 133 as previously described. The positive cathode voltage of tube VK185 serves to prime tube VK177. Further when tube VT20 conducts, tube VT21 is cut off as described for an outgoing call and the resulting positive voltage at the anode is applied to the trigger electrode of tube VK173 which is primed from the called subscriber's line circuit. This tube therefore strikes and causes the striking of tubes VK170, VK171 and VK172, the latter having been primed over lead 113.

Returning to the incoming trunk connecting circuit (Fig. 24), the positive voltage developed on resistor R103 when tube VK158 in the line finder/final selector common control strikes, is applied over lead 204 to pulse tube VK770 in the group selector common control. Tube VK770 is one of a plurality of sets of twenty tubes of which only one set VK770 to VK789 is indicated, there being as many sets as there are group selectors. Each tube of a set is individual to one incoming trunk connecting circuit of the twenty such connecting circuits accessible to a particular group selector. The striking of tube VK770 thus determines the group selector over which the connection is to be extended and the positive cathode voltage causes a positive potential to be applied to lead 201 to pulse tubes such as VK809 (Fig. 23). Only one of these tubes, namely VK809 will have been primed as previously described and this tube strikes. Tube VK809 accordingly strikes and causes the striking of tubes VK806, VK807, VK808 and VN162. The striking of tube VN162 causes a positive voltage to be developed on resistor R92 and this positive voltage strikes tube VK805. Current now flowing through rectifier MR21 and resistor R93 applies a positive potential to the control grid of tube VT80 which thereupon conducts and removes the priming potential from the trigger electrode of tube VK804 thus busying the link. The striking of tube VK805 applies a positive pulse to tubes such as tube VK803 in the primary multiple. Only one of these tubes will have been primed, namely tube VK803 and this tube strikes. Tube VK803 in striking causes the striking of tubes VK800, VK801, VK802 and VN160. As a result of the striking of tube VN160 a positive voltage is developed on resistor R94 and current therefore flows through rectifier MR20 and resistor R93 thereby applying a further control on the control grid of tube VT80. Further when tubes VN160 and VN162 become conducting, a path is completed for transmitting voice frequency current from the outgoing trunk connecting circuit through the group selector to the incoming trunk connecting circuit. This path extends from the secondary winding of transformer TR5, lead 151, tubes VK803, VN160, capacitor C25, tubes VN162, VK809, lead 221, transformer TR10. In the incoming trunk connecting circuit, the voice frequency current is amplified by tube VT90, rectified and voltage doubled by the network RVD5, the output from which causes the normally cut off tube VT91 to conduct, thereby extinguishing tube VK821.

The connection between the calling and called line is now complete and the called subscriber is rung. This takes place when tube VK172 (Fig. 8) is struck as previously described. This strikes the control gap of tube VK1 in the called subscriber's line circuit, the anode of which is connected by lead RS to a suitable common supply of ringing current. Ringing current is thus applied to the called subscriber's line for as long as the control gap is triggered.

The transmission of ring tone to the calling subscriber's line also takes place at this time. The arrangements are not shown in detail but it is believed that sufficient have been shown to enable the operation to be understood. In the first place the line finder/final selector common control includes a tone control pulse circuit (not shown) consisting of three tubes, the cathodes of which are connected over isolating rectifiers to a common lead extending to all the group selector common control circuits. One of these tubes is struck when tube VN13 strikes, a second is struck on a delayed pulse from the delay circuit PD1 and the third is struck from the positive voltage on resistor R22. Three successive pulses are thus transmitted to the group selector common control whence they are repeated over lead 198 in the register connector to the pulse repeater tube VK225. This tube is primed from resistor R83 in the group selector common control and hence repeats the pulse through tubes VT42, VK221 and lead 162 leading to the outgoing trunk connecting circuit. In this circuit the three pulses cause the successive operation of tubes VK213, VK214 and VK215, the latter tube applying a biasing potential to the tone generator whereby ring tone is transmitted to the calling line.

The transmission of the first of the three pulses operates a delay circuit (not shown) in the register which gives an artificial B pulse to tube VK265 which causes the release of the register by reduction of the HT supply voltage.

Before considering the operation when the called subscriber replies, it should be mentioned that when tube VT21 in the link circuit is cut off as previously described, the positive anode voltage is applied over lead 112 to the line finder/final selector common control where it triggers tube VK125 thereby releasing the common control in the same manner as described for an outgoing call.

When the called subscriber lifts his receiver, the voice frequency gate circuit in his line circuit is opened and voice frequency current thus flows from lead VF1 over the metal rectifier MR1, capacitor C1, lead 101, tubes VN30 and VK173, capacitor C11, tubes VN33 and VK195, lead 134, to the primary winding of transformer TR14. The voice frequency current is amplified by tube VT94 and rectified and voltage-doubled by the network RVD6, the output from which cuts off the normally conducting tube VT93 whereby tube VK822 strikes. The consequent positive voltage on resistor R104 causes tube VK825 to strike, thereby applying a negative-going pulse to the control grid of the normally conducting tube VT95. The consequent positive anode pulse is fed over lead 133 to cause tube VK194 to strike in the line finder/final selector link at the called end of the connection. The resultant positive potential on R39 pulses tube VK186 but as the priming on this tube was removed when tube VK184 was extinguished on the striking of VK185 as previously described, the pulse is without effect. A pulse is, however, applied from resistor R39 to the trigger electrode of tube VK182 and this tube strikes thereby applying a pulse to the trigger electrode of tube VK177 which is primed when tube VK185 strikes as previously described. Tube VK177 in striking reduces the HT supply to tube VK172 for a period long enough to enable this tube to be extinguished. The extinguishing of tube VK172 extinguishes the control gap of tube VK1 in the subscriber's line circuit whereby the transmission of ringing current to the called line is terminated.

Returning to the incoming trunk connecting circuit (Fig. 24), the positive potential on resistor R104 also causes tube VN170 to strike and the resultant decrease of the voltage drop across resistor R105 causes tube VT92 to conduct. Tube VK821 is now held extinguished by the conducting of both tubes VT91 and VT92 which are controlled from opposite ends of the connection to provide the "last party release" facility. The reduction of the negative voltage drop across resistor R105 also opens the voice frequency gate circuit consisting of resistor R106 and rectifier MR25 whereby voice frequency current is fed over transformer TR11, lead 220, tubes VK808 and VK802, lead 150 to the primary winding of transformer TR7. The voice frequency current is amplified by tube VT35 and rectified and voltage doubled by the network RVD2, the output from which serves to cut off the normally conducting tube VT34. When tube VT34 is cut off, the normally non-conducting tube VT33 conducts and extinguishes the normally conducting tube VK206. Further when tube VT34 is cut off, the normally non-conducting tube VK207 strikes after a delay and the consequent cathode voltage is applied to the trigger electrodes of tubes VK209 and VK216. Both the tubes strike and tube VK216 initiates the release of the register and group selector common control as will be described later. Tube VK209 which is a self-extinguishing pulse repeater tube in striking transmits a negative-going pulse to the control grid of the normally conducting tube VT31. This tube is cut off for the duration of the pulse and consequently a positive pulse is fed from the anode thereof over lead 130 to strike the tube VK190 also for the duration of the pulse. The cathode resistor of this tube is resistor R39 and the consequent positive voltage on this resistor serves to strike tube VK186 which is primed from the normally conducting tube VK184. This positive voltage is also applied as a pulse to the trigger electrode of tube VK182 but as this tube is not primed when the link circuit is in use on an outgoing call, the pulse is without effect. Tube VK186 in striking causes a pulse to be applied to tubes VK175, VK176, VK178 and VK179. Tube VK176 has already been struck as previously described and primes tubes VK175 and VK179 so that these tubes now strike. Tube VK178 is not yet primed so that the pulse is without effect on this tube. Tube VK179 in striking primes tube VK178 while tube VK175 in striking causes the striking of the primed tube VK174, the cathode resistor of which is resistor R5 in the subscriber's line circuit. The positive voltage on resistor R5 strikes the control gap of tube VK4, the anode of which is connected to a common pulse source over lead MS. The main gap of tube VK4 is thus struck on the first of these pulses after the priming of the tube and the current flow through the tube operates the subscriber's meter MTR.

Returning to the incoming trunk connecting circuit (Fig. 24), the positive voltage on resister R104 also causes tube VK824 to strike which in turn strikes tube VK823. The voltage appearing across resistor R104 charges capacitor C30 over resistor R107 and 250 millisecs later sufficient voltage exists across capacitor C30 to strike tube VK824 which in turn strikes tube VK823. The cathode voltage of VK823 will serve to close the voice frequency gate circuit comprising resistor R106 and rectifier MR25 and the transmission of voice frequency current from the source connected to lead VF5 over transformer TR11 and lead 220 and thence to lead 150 will be terminated. In the outgoing trunk connecting circuit (Fig. 11), the termination of voice frequency current flow causes tube VT34 to conduct again, thereby cutting off tube VT33 and extinguishing tube VK207. When tube VT33 is cut off, tube VK206, strikes after a delay and pulses tube VK208. Tube VK208 strikes and transmits a second negative-going pulse to the control grid of tube VT31. This tube is again cut off for the duration of the pulse and the consequent positive anode potential is applied over lead 130 to tube VK190 of the line finder/final selector at the calling end of the connection. Tube VK190 strikes and remains conducting for the duration of the pulse, thus striking the pulse repeater tube VK186. The positive cathode voltage of tube VK186 is again applied to the trigger electrodes of tubes VK175, VK176, VK178 and VK179. Tube VK176 which was extinguished when tube VK179 struck on the last pulse again strikes but without effect. Further tube VK178 which is now primed from tube VK179, strikes and extinguishes tube VK174 due to the common anode supply. Tube VK174 when extinguished removes the priming voltage from the tube VK4 in the calling subscriber's line circuit thereby releasing the calling subscriber's meter.

With regard to the release of the register and the group selector common control on the striking of tube VK216 in the outgoing trunk connecting circuit, the means for effecting this release have not been shown in detail. The operation does, however, take place in a somewhat similar manner to that of the line finder/final common control previously described. That is to say, a voltage stabilising circuit provides the HT supply to the tubes in the group selector common control and the positive potential at the cathode of tube VK216 is applied to a reset circuit which controls the voltage stabilising circuit so that the HT supply is disconnected from the tubes in the group selector common control and also from lead 197. The common control is thus restored to normal and tube VK222 in the register connector RC is extinguished. This causes the removal of the positive potential from lead 152 and hence from the trigger electrodes of the tubes such as VK803 in all the sets of tubes of the primary group selector which have been primed.

Conversation may now take place between the calling and called subscriber, battery feed being provided over impedance IO in the line circuits. It will be noted that a bothway amplifier BWA (Fig. 10) may, if desired, be included in the connection. The connection is held by the transmission of voice frequency current from the calling line circuit through the line finder/final selector to the outgoing trunk connecting circuit and thence through the group selector to one side of the incoming trunk connecting circuit and from the called line circuit through the line finder/final selector to the other side of the incoming trunk connecting circuit, these two transmission paths having been described in detail previously.

A description will now be given of the release of the connection and for this purpose it will be assumed that the calling party replaces his receiver first. The voice frequency gate in calling subscriber's line circuit will thus be closed and the transmission of voice frequency current from the lead VF1 to the outgoing trunk connecting circuit will be terminated. Referring to the outgoing trunk connecting circuit, tube VT32 will be cut off on the cessation of current flow, thereby allowing tube VK200 to strike after a delay. When tube VK200 strikes, the positive cathode voltage is applied over lead B to the similarly referenced leads connected to the trigger electrodes of the three tubes VK202, VK203 and VK217, and these three tubes strike. Tube VK217 is a self-extinguishing pulse repeater tube and when it strikes it serves to extinguish tube VK216.

The application of the B pulse to the trigger electrode of the pulse repeater tube VK203 causes a reduction in anode voltage applied over lead D. This reduction in anode voltage is effective first in reducing the voltage applied via the primary winding of transformer TR3 and lead 131 to the anode of tube VK191 in the line finder outgoing multiple and this tube is accordingly extinguished. Secondly the reduction in anode voltage is effective in reducing the voltage applied via the primary winding of transformer TR7 and lead 150 to tube VK802 in the group selector and this tube is accordingly extinguished. Thirdly the reduction in anode voltage is effective in reducing the voltage applied via the secondary winding of transformer TR5 and lead 151 to the tube VK803 in the group selector and this tube is extinguished, thus terminating the transmission of voice frequency current from the outgoing trunk connecting circuit through the group selector to the incoming trunk connecting circuit.

As previously mentioned tube VK202 forms with tube VK201 a bi-stable pair of which tube VK201 conducts while the trunk relay set is in use. The B pulse applied to the trigger electrode of tube VK202 causes this tube to conduct and a pulse is passed through capacitor C17 to the cathode of tube VK201. The cathode potential of tube VK201 is thus increased positively to such a value that the tube is extinguished. When the cathode voltage of tube VK201 falls, tubes VN40 and VN41 are extinguished, tube VN40 closing the voice frequency gate thereby preventing further transmission of voice frequency current over transformer TR5. Tube VN41 when extinguished removes the priming potential from tube VK204.

The B pulse is also effective on the bothway amplifier BWA which supplies the anode voltage to the speech path tubes VK188 and VK189 in the line finder/final selector and VK800 and VK801 in the group selector. Both these pairs of tubes are extinguished. The outgoing trunk connecting circuit is now restored to normal.

When tube VK191 in the line finder/final selector is extinguished as previously explained, tube VN31 is also extinguished and the positive potential is thus removed from the control grid of tube VT20. This tube, is therefore, cut off and the increase in anode voltage is applied as a pulse to VK181 and VK183, both of which are connected as self-extinguishing pulse repeaters. Tube VK181 in striking serves to extinguish tubes VK170 and VK171 while tube VK183 strikes but is without effect.

The increased anode potential of tube VT20 also enables tube VT21 to conduct again thereby extinguishing tube VK173 and reducing the potential applied to lead 112. Finally the increased anode potential of tube VT20 causes the self-extinguishing pulse repeater tube VK180 to strike thereby extinguishing tubes VK179 and VK176.

When tube VK173 is extinguished as described previously, tube VN30 is extinguished and hence the positive potential applied from resistor R2 to the cathode of tube VK2 is removed. The line circuit and the line finder/final selector are now completely restored to normal. It should be mentioned as regards the line circuit that the tube VN1 does not normally strike. It has been inserted in the circuit to prevent any high voltage surges causing VK2 to strike.

Referring now to the group selector (Fig. 23), it has already been explained how tubes VK800, VK801, VK802 and VK803 are extinguished. When tube VK802 is extinguished, tube VN160 is also extinguished. The current flow through resistor R94, rectifier MR20 and resistor R93 therefore ceases but the potential on the control grid of tube VT80 is still sufficient to allow this tube to conduct and prevent the priming of tube VK804 due to rectifier MR21. The group selector remains in this condition until the called subscriber replaces his receiver.

As regards the incoming trunk connecting circuit, when the transmisison of voice frequency current thereto from the outgoing trunk connecting circuit is terminated as previously described, tube VT91 is cut off and the anode voltage would rise if tube VT92 is cut off. However since tube VT92 is still conducting, as it is assumed that the called subscriber has not yet replaced his receiver, this increase in the anode potential of tube VT91 does not take place and tube VK821 does not strike.

When the called subscriber replaces his receiver, the transmission of voice frequency current from his line circuit to the incoming trunk connecting circuit ceases and in the incoming connecting circuit, tube VT93 conducts, tube VK822 is extinguished followed by tube VN170 whereupon tube VT92 is cut off thereby enabling tube VK821 to strike since tube VT91 has already been cut off as previously described.

When tube VK821 strikes the positive cathode voltage is applied as a B pulse to the similarly reference leads in the circuit. This causes the self extinguishing tube VK820 to strike thereby extinguishing tubes VK806–7 in the group selector and tubes VK192 and VK193 in the line finder/final selector. In addition the B pulse causes the self-extinguishing tube VK826 to strike thereby extinguishing tubes VK808 and VK809 in the group selector and tube VK195 in the line finder/final selector. The incoming trunk connecting circuit is now completely restored to normal.

When tube VK809 in the group selector is extinguished, the positive voltage is removed from R92 and current flow over this resistor, rectifier MR21 and resistor R93 ceases. The tube VT80 is cut off and priming potential is again applied to the trigger electrode of tube VK804. The group selector is now completely restored to normal.

With regard to the line finder/final selector at the called end of the connection, the release of this circuit is substantially as that described previously for the circuit at the calling end of the connection. Release is initiated when tube VK195 is extinguished as previously described and is followed by the extinguishing of tube VN33. Tube VT20 is thus cut off and causes tube VK184 to strike thereby extinguishing tube VK185. Tube VK180 also strikes but is without effect since none of the tubes VK175, VK176, VK178 and VK179 have been struck.

The operation of the circuit will now be considered in the case when the called subscriber is busy. In this case a positive voltage on resistor R2 in the called subscriber's line circuit will be applied to the cathode of tube VK2 so that tube VN2 is unable to strike when positive potential is applied to lead 105 from the incoming distributor ICD in the line finder/final selector common control. As a result neither of tubes VK2 and VK3 in the line circuit will strike and none of the link circuits will be taken into use from the line circuit. Tube VK126 in the common control will hence not be struck and in consequence neither will tube VK128. None of the tubes in the incoming trunk test circuit will therefore be struck and there will be no positive potential developed on resistor R22. A pulse from resistor R15 and a delayed pulse from the pulse delay circuit PD1 will, however, be applied to the tone control pulse circuit which will deliver two pulses to the group selector common control and these will be repeated from the common control to lead 198 in the register. Two pulses will accordingly be transmitted over lead 162 to cause the sequential striking of tube VK213 and VK214, the striking of VK214 extinguishing tube VK213. The positive cathode voltage from tube VK214 will be effective on the tone circuit to cause busy tone to be transmitted to the calling subscriber.

The calling subscriber will now replace his receiver and the restoration to normal of the line circuit and the line finder/final selector will take place substantially as previously described. As regards the outgoing trunk connecting circuit, the termination of the transmission thereto of voice frequency current also terminates the transmission of voice frequency current to the register over lead 153. Tube VT44 is thus cut off and tube VK227 strikes after a delay. The B pulse at the cathode of tube VK227 causes tubes VK263 and VK265 to strike, the latter being arranged, although not so shown in detail in the drawing, to extinguish all the operated tubes in the register while the former in striking renders the register available for further use. As regards the group selector common control, the time throw out circuit TTO3 will become effective and cause the release of the common control, again by reducing the anode voltage supply for the operated tubes.

We claim:

1. A telephone system comprising a line finder/final selector stage, a group selecting stage, each of said switching stages comprising a plurality of primary switching units and a plurality of secondary switching units, each switching unit consisting of a plurality of first paths, a plurality of sets of gas discharge tubes arranged in groups, each first path being connected to the sets of tubes of one group, a plurality of second paths each connected to corresponding tubes of all the groups, link circuits connecting said second paths of one of said primary switching units to the first paths of different ones of said secondary switching units, subscribers' lines arranged in groups, each group being connected to the first paths of a plurality of primary switching units, subscribers' lines arranged in groups, each group being connected to the first paths of a plurality of primary switching units of said line finder/final selector stage, outgoing trunk connecting circuits connected between certain of the second paths of the secondary switching units of said line finder/final selector switching stage and the first paths of the primary switching units of said group selecting stage, incoming trunk connecting circuits connected between the second paths of the secondary switching units of said group selecting stage and certain other second paths of the secondary switching units of said line finder/final selector stage, first common electronic equipments associated with said line finder/final selector switching stage, each allocated to a group of subscribers' lines, means responsive to a calling condition on a subscriber's line for associating one of said first common equipments with said subscriber's line, means in said first common equipments for controlling the striking of a set of tubes in one of the primary and secondary switching units of said line finder/final selector stage thereby to complete a connection between a calling subscriber's line and an outgoing trunk connecting circuit and to release said first common equipment, an electronic register, a single common electronic equipment for said group selecting stage, means in said register responsive to the reception from said calling subscriber's line of dialled digits indicative of the numerical designation of a wanted subscriber's line for associating said second common electronic equipment with said register, means in said second electronic equipment for taking into temporary use all available incoming trunk connecting circuits accessible to said outgoing trunk connecting circuit through said group selecting stage and for extending markings to said first common electronic equipments in accordance with the incoming trunk connecting circuits taken into use, means in said second electronic equipment responsive to the numerical designation of a wanted subscriber's line for taking into use one of said first common electronic equipments associated with the group of subscribers' lines which includes the wanted line and for extending markings thereto as determined by said numerical designation, means in said first electronic equipment responsive to the markings from said second electronic equipment and to the markings from said seized incoming trunk connecting circuits for striking a set of tubes in a primary and secondary switching unit of said line finder-final selector stage to complete a connection between said wanted line and the first of the seized incoming trunk connecting circuits accessible to said wanted line, means responsive to the completion of said connection for releasing said first common electronic equipment means in said second common electronic equipment responsive to the completion of said connection for striking one set of tubes in a primary and secondary switching unit of said group selecting stage to complete a connection between said outgoing trunk connecting circuit and said first incoming trunk connecting circuit and means responsive to the completion of said last mentioned connection for releasing said register and said second electronic equipment.

2. A telephone system as claimed in claim 1 wherein said electronic register includes a plurality of electronic counting chains one for storing each digit in the wanted subscriber's number to a predetermined maximum, an electronic sequence device for directing successive digits to said counting chains and means for advancing said sequence device over one or more of said chains without digit storage thereby to enable said register to deal with subscribers' numbers having a lesser number of digits than said maximum number.

3. A telephone system as claimed in claim 1 and including a register connector, means in said register connector for continuously scanning said outgoing trunk connecting circuits and means in said register connector responsive to a calling condition in one of said trunk connecting circuits for inhibiting said scanning operation and for associating said register with said calling outgoing trunk connecting circuit.

4. A telephone system as claimed in claim 1 and including a plurality of registers, a connecting circuit associated with said single common electronic equipment for said group selecting stage, means in said connecting circuit for scanning said registers, means in said registers responsive to the storing of the digits forming a wanted subscriber's number for extending a calling condition to said connecting circuit and means in said connecting circuit responsive to said calling condition for inhibiting said scanning operation and associating said single common electronic equipment with said calling register.

5. A telephone system as claimed in claim 4 and including means in said outgoing trunk connecting circuit responsive to the association of said register with said single common equipment for applying a priming potential to one tube of each of the sets of tubes in a primary switching unit of the group selecting stage which is connected to said outgoing trunk connecting circuit.

6. A telephone system as claimed in claim 5 and including means for extending said priming potential through the link circuits connected to said sets of tubes to one tube of the sets of tubes of the secondary switching units of the group selecting stage to which said link circuits are connected, means for extending said priming potential to the incoming trunk connecting circuits accessible to said link circuits, an allotter circuit included in each of said first common electronic equipments and means responsive to the seizure of one of said first common electronic equipments by said single common equipment for extending markings to said allotter circuits from said incoming trunk connecting circuits.

7. A telephone system as claimed in claim 6 and including means for initiating the operation of said allotter circuit to take into use one of said incoming trunk connecting circuits which is accessible to the wanted subscriber's line over the line finder/final selector stage, the taking into use of said incoming trunk connecting circuit serving to strike a set of gas discharge tubes in the primary and secondary switching units of the line finder/final selector stage to complete the connection between the wanted subscriber's line and said incoming trunk connecting circuit and also serving to strike a set of primed gas discharge tubes in the primary and secondary switching units of the group selecting stage to complete the connection between the selected outgoing trunk connecting circuit and said incoming trunk connecting circuit.

8. A telephone system as claimed in claim 2 and including electronic storage circuits in said single common electronic equipment, means for transferring exchange digits from the electronic counting chains in said register to said electronic storage circuits, a plurality of translation gas discharge tubes in said single common electronic equipment, means in said single common electronic equipment responsive to the storage of said exchange digits for striking one of said translation tubes corresponding to the particular combination of exchange digits stored, further electronic storage circuits in said single common electronic equipment and means responsive to the striking of said one translation tube for storing translated digits in said further storage circuits.

9. A telephone system as claimed in claim 8 and including means responsive to the striking of a translation tube representing a local call for transferring the numerical digits from said register to electronic storage circuits in said single common electronic equipment.

10. A telephone system as claimed in claim 9 wherein the subscribers' lines are arranged in non-decimal groups and means are provided in said single common electronic equipment for converting the decimal registration of the numerical digits into a plurality of non-decimal markings less in number than the number of numerical digits, one of said markings serving to select the first common electronic equipment which serves the group of lines including the wanted subscriber's line, while the remaining markings mark the wanted subscriber's line within the group.

11. A telephone system as claimed in claim 10 and including a plurality of gas discharge tubes, means for striking one of said gas discharge tubes to generate said one marking, means for preventing the striking of said one gas discharge tube if said first common electronic equipment is unavailable, a source of pulses and means for connecting said source of pulse to said gas discharge tube if said first common electronic equipment is unavailable thereby enabling repeated testing of said first common equipment to be effected.

12. A telephone system as claimed in claim 1 and including means in the link circuits associated with said line finder/final selector stage responsive to the connection of a secondary switching unit of said stage to an outgoing trunk connecting circuit for controlling the metering of the call against the calling subscriber and further means in said link circuits responsive to the connection of a secondary switching unit to an incoming trunk connecting circuit for transmitting ringing current to the wanted subscriber's line.

References Cited in the file of this patent

UNITED STATES PATENTS

| | | |
|---|---|---|
| 2,317,471 | Meacham | Apr. 27, 1943 |
| 2,326,478 | Meacham | Aug. 10, 1943 |
| 2,518,022 | Keister | Aug. 8, 1950 |
| 2,543,534 | Powell | Feb. 27, 1951 |
| 2,582,959 | Bruce et al. | Jan. 22, 1952 |
| 2,683,806 | Moody | July 13, 1954 |
| 2,688,078 | Bess | Aug. 31, 1954 |
| 2,693,534 | Bertram | Nov. 2, 1954 |
| 2,693,593 | Crosman | Nov. 2, 1954 |
| 2,698,382 | Uglow et al. | Dec. 28, 1954 |
| 2,709,771 | Dehn | May 31, 1955 |
| 2,719,250 | Six et al. | Sept. 27, 1955 |
| 2,747,021 | Chubb et al. | May 22, 1956 |
| 2,766,327 | Lesti | Oct. 9, 1956 |
| 2,773,937 | Morris | Dec. 11, 1956 |
| 2,780,674 | Six | Feb. 5, 1957 |